US010661177B2

(12) United States Patent
Kataoka et al.

(10) Patent No.: US 10,661,177 B2
(45) Date of Patent: May 26, 2020

(54) INFORMATION PROCESSING SYSTEM, STORAGE MEDIUM HAVING STORED THEREIN INFORMATION PROCESSING PROGRAM, INFORMATION PROCESSING APPARATUS, AND INFORMATION PROCESSING METHOD

(71) Applicant: NINTENDO CO., LTD., Kyoto, Kyoto (JP)

(72) Inventors: Ryo Kataoka, Kyoto (JP); Hiromasa Shikata, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 15/661,102

(22) Filed: Jul. 27, 2017

(65) Prior Publication Data

US 2018/0056192 A1  Mar. 1, 2018

(30) Foreign Application Priority Data

Aug. 26, 2016 (JP) ................................ 2016-165390

(51) Int. Cl.
*A63F 13/655* (2014.01)
*A63F 13/42* (2014.01)
(Continued)

(52) U.S. Cl.
CPC .......... *A63F 13/655* (2014.09); *A63F 13/213* (2014.09); *A63F 13/214* (2014.09);
(Continued)

(58) Field of Classification Search
None
See application file for complete search history.

(56) References Cited

U.S. PATENT DOCUMENTS 8,249,334 B2 * 8/2012 Berliner ............. G06K 9/00362
345/419
8,864,581 B2 * 10/2014 Leyvand .................. A63F 9/24
382/103
(Continued)

FOREIGN PATENT DOCUMENTS

JP 2007-158941 6/2007
JP 2012-146022 8/2012
(Continued)

OTHER PUBLICATIONS

Office Action dated Feb. 26, 2019 issued in Japanese Application No. 2016-165390 (5 pgs.)

*Primary Examiner* — James S. McClellan
*Assistant Examiner* — Peter J Iannuzzi
(74) *Attorney, Agent, or Firm* — Nixon & Vanderhye P.C.

(57) ABSTRACT

Transmission data including at least data regarding luminances of a plurality of small areas obtained by dividing the entirety of an at least partial area of a captured image captured by an image capturing unit is acquired. Then, using the acquired transmission data, and based on a luminance of the entirety of the at least partial area of the captured image and the luminance of any of the plurality of small areas, a shape of an image capturing target and/or a position of the image capturing target relative to a data transmission device are determined, and based on the result of the determination, predetermined information processing is performed.

20 Claims, 16 Drawing Sheets

(51) Int. Cl.
*A63F 13/213* (2014.01)
*A63F 13/30* (2014.01)
*A63F 13/40* (2014.01)
*A63F 13/214* (2014.01)
*A63F 13/24* (2014.01)
*A63F 13/25* (2014.01)
*A63F 13/211* (2014.01)
*A63F 13/92* (2014.01)

(52) U.S. Cl.
CPC .............. *A63F 13/24* (2014.09); *A63F 13/25* (2014.09); *A63F 13/30* (2014.09); *A63F 13/40* (2014.09); *A63F 13/42* (2014.09); *A63F 13/211* (2014.09); *A63F 13/92* (2014.09)

(56) References Cited

U.S. PATENT DOCUMENTS

| | | | | |
|---|---|---|---|---|
| 9,278,287 | B2* | 3/2016 | Leyvand | A63F 9/24 |
| 2003/0118233 | A1* | 6/2003 | Olsson | G06K 9/38 |
| | | | | 382/173 |
| 2007/0052177 | A1* | 3/2007 | Ikeda | A63F 13/24 |
| | | | | 273/317 |
| 2008/0303812 | A1* | 12/2008 | Dohta | G06T 15/00 |
| | | | | 345/419 |
| 2012/0223952 | A1* | 9/2012 | Kanemaru | G06T 13/40 |
| | | | | 345/473 |
| 2014/0078312 | A1* | 3/2014 | Zalewski | A63F 13/04 |
| | | | | 348/169 |
| 2014/0125634 | A1* | 5/2014 | Yokokawa | G06F 3/011 |
| | | | | 345/175 |
| 2015/0070526 | A1* | 3/2015 | Kinoshita | H04N 5/23219 |
| | | | | 348/222.1 |
| 2015/0350523 | A1* | 12/2015 | Kinoshita | H04N 5/23212 |
| | | | | 348/352 |
| 2016/0119506 | A1* | 4/2016 | Namihira | H04N 1/64 |
| | | | | 358/426.01 |
| 2016/0231773 | A1 | 8/2016 | Inoue et al. | |
| 2016/0371569 | A1* | 12/2016 | Palmer, III | G06K 9/00281 |

FOREIGN PATENT DOCUMENTS

JP 2016-148903 8/2016
WO 2013/102972 A1 7/2013

* cited by examiner

F I G. 6
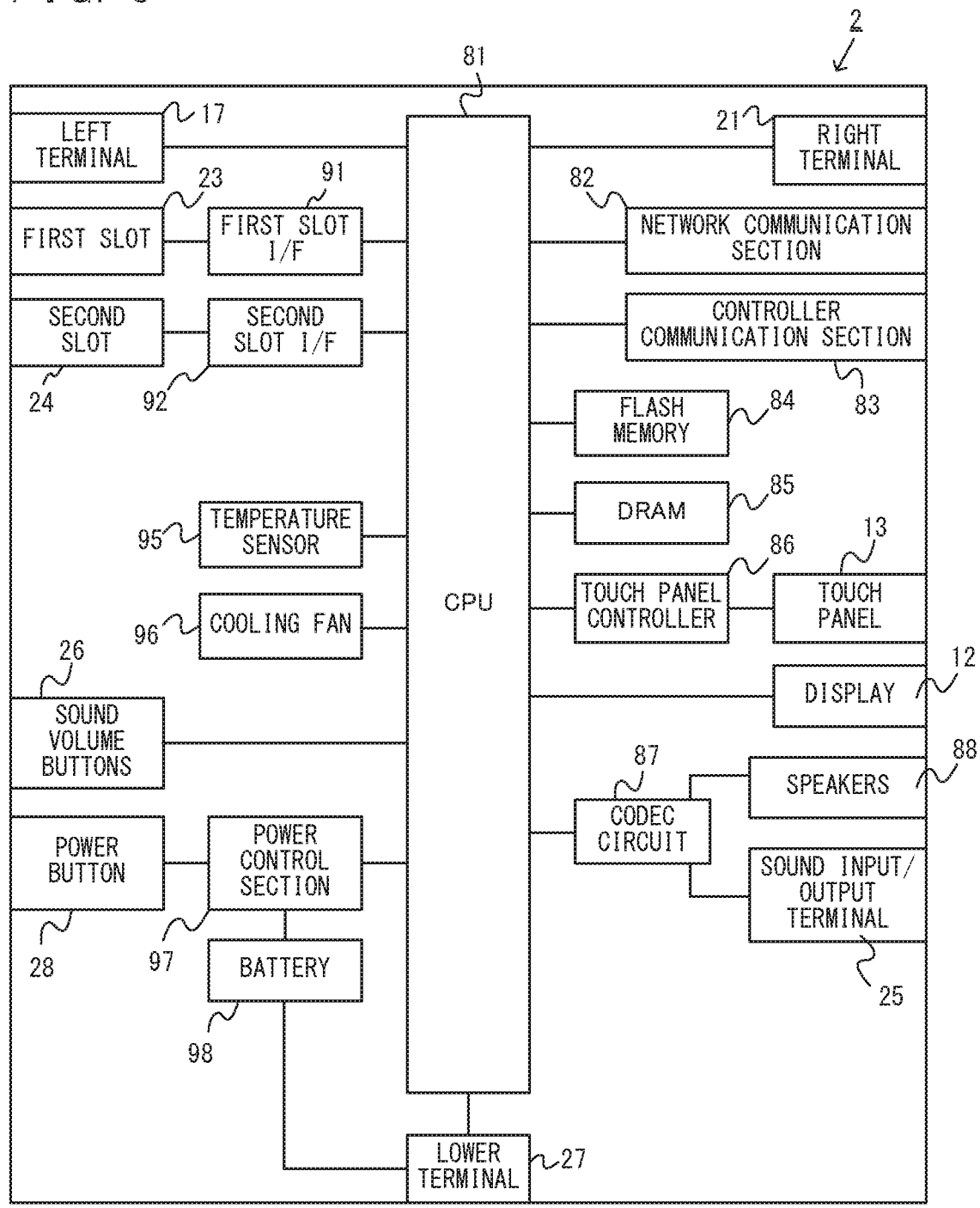

F I G. 1 0
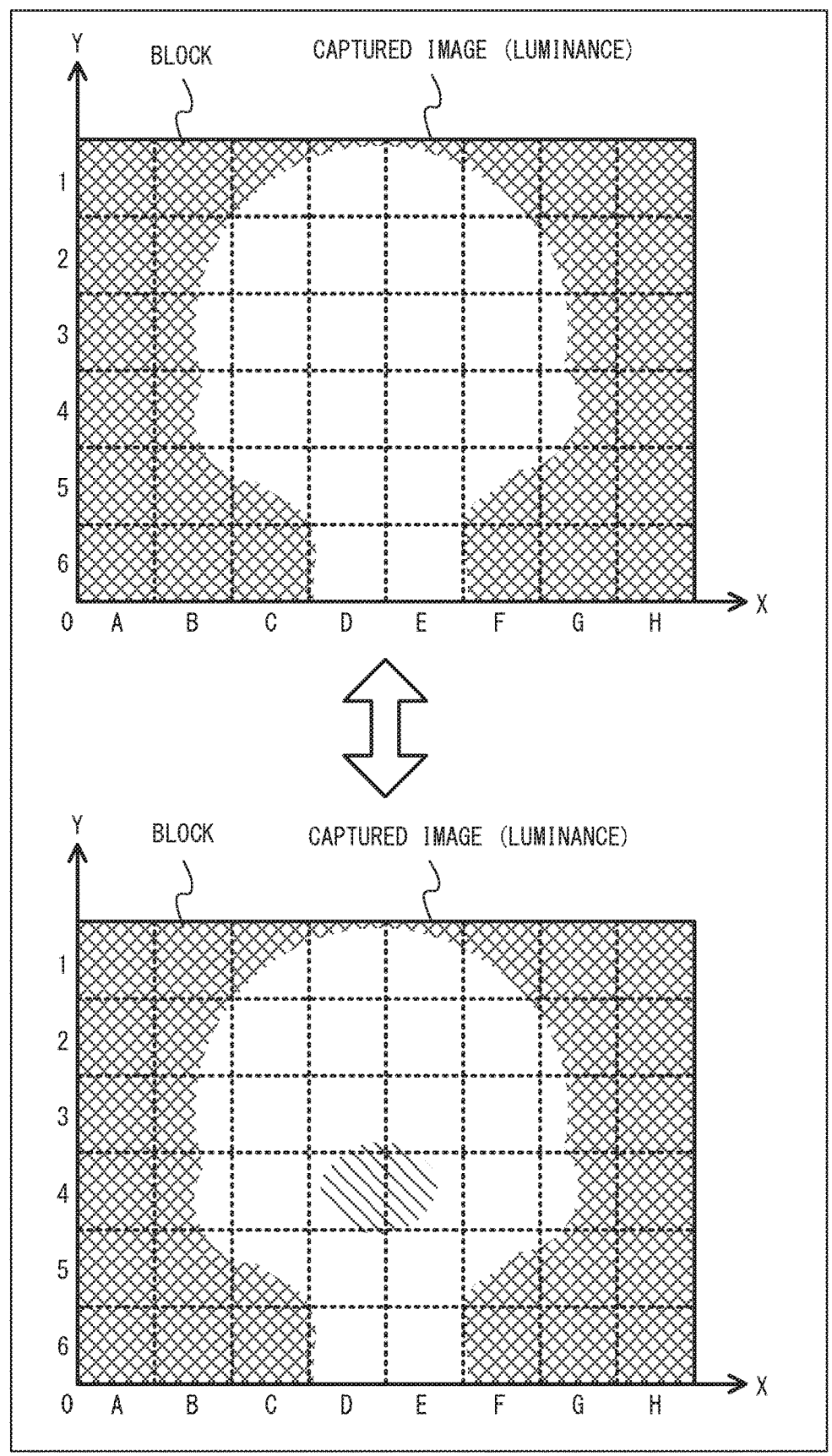

F I G. 1 4
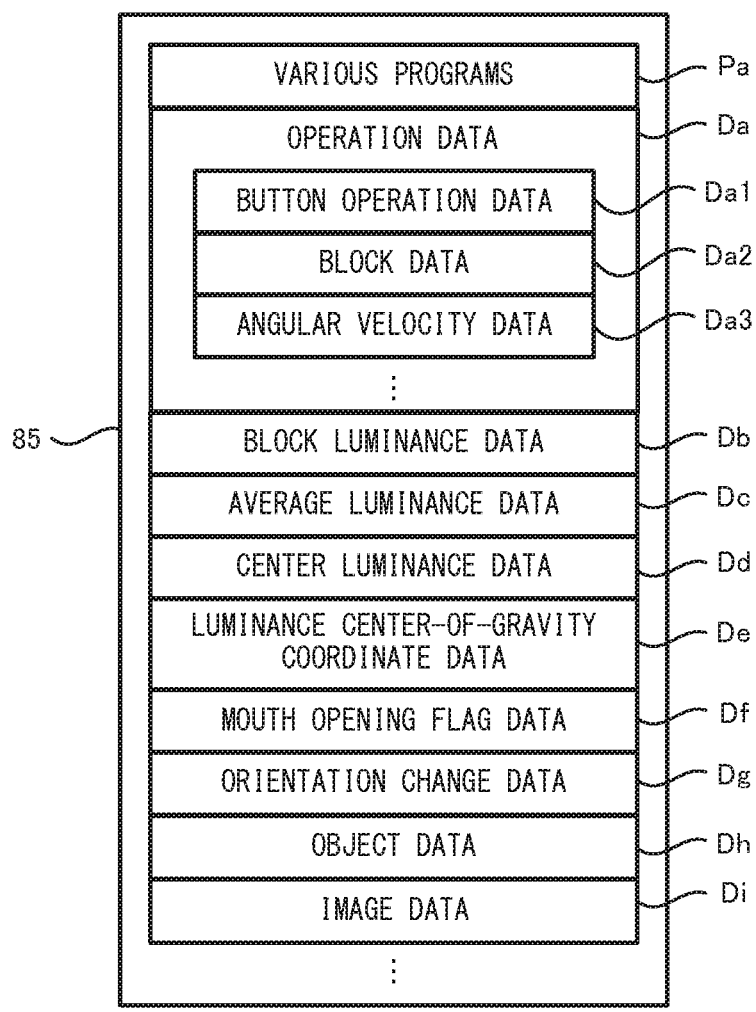

INFORMATION PROCESSING SYSTEM, STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

The disclosure of Japanese Patent Application No. 2016-165390, filed on Aug. 26, 2016, is incorporated herein by reference.

FIELD

The technology shown here relates to an information processing system, a storage medium having stored therein an information processing program, an information processing apparatus, and an information processing method, and in particular, relates to, for example, an information processing system including an information processing apparatus and a data transmission device for transmitting data to the information processing apparatus, a storage medium having stored therein an information processing program executed by the information processing apparatus, an information processing apparatus included in the information processing system, and an information processing method for performing information processing based on data transmitted from the data transmission device.

BACKGROUND AND SUMMARY

Conventionally, there is an information processing system for receiving, from a data transmission device including an image capturing section, data generated based on an image captured by the image capturing section and performing information processing based on the received data.

The information processing system, however, requires another device in addition to an information processing apparatus and a data transmission device for transmitting data to the information processing apparatus. Thus, the number of devices for performing information processing increases.

Therefore, it is an object of an exemplary embodiment to provide an information processing system, a storage medium having stored therein an information processing program, an information processing apparatus, and an information processing method that can be achieved with a more simple configuration.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to the exemplary embodiment, an information processing system includes an information processing apparatus and a data transmission device for transmitting data to the information processing apparatus. The data transmission device includes: an image capturing unit; and a computer configured to: generate transmission data including at least data regarding luminances of a plurality of small areas obtained by dividing the entirety of an at least partial area of a captured image captured by the image capturing unit; and transmit the generated transmission data to the information processing apparatus. The information processing apparatus includes a computer configured to: acquire the transmission data; using the acquired transmission data, and based on a luminance of the entirety of the at least partial area of the captured image and the luminance of any of the plurality of small areas, determine a shape of the image capturing target and/or a position of the image capturing target relative to the data transmission device; and based on the result of the determination, perform predetermined information processing.

Based on the above, the shape of an image capturing target and/or the position of the image capturing target relative to a data transmission device can also be determined only by an information processing apparatus and the data transmission device. Thus, it is possible to achieve this determination with a simple system configuration. Further, it is also possible to reduce the amount of transmitted data as compared with a case where the data transmission device transmits a captured image itself to the information processing apparatus.

Further, in the generation of the transmission data, a use area for use in generating the transmission data in a part of the captured image may be set, the entirety of the at least partial area may be the use area, and inside of the use area may be divided to set the plurality of small areas.

Based on the above, the image capturing target is determined using a partial area of the captured image, whereby it is possible to make a more detailed determination.

Further, in the determination of the position of the image capturing target, the determination may be made based on whether or not both a change in the luminance of the entirety of the area and a change in the luminance of a small area at a predetermined position among the plurality of small areas occur.

Based on the above, it is possible to determine that a distance and a shape change only in a part of the image capturing target.

Further, in the generation of the transmission data, the transmission data including data allowing obtaining of coordinates of a center of gravity of the luminance of each of the small areas may be generated. In the determination of the position of the image capturing target, the determination may be made based on coordinates of a center of gravity of the luminance of the entirety of the area calculated using the data included in the transmission data and allowing the obtaining of the coordinates of the center of gravity.

Based on the above, it is possible to determine the shape of the image capturing target and/or the position of the image capturing target near the center of the entirety of an area including all of a plurality of divided small areas.

Further, in the determination of the position of the image capturing target, when changes in the coordinates of the center of gravity of the luminance in the entirety of the area are less than or equal to a certain change, and both a change in the luminance of the entirety of the area and a change in the luminance of a small area at a predetermined position among the plurality of small areas occur, it may be determined that a predetermined portion of the image capturing target changes.

Based on the above, it is possible to determine a change in the shape of the image capturing target and/or a change in the position of the image capturing target near the center of the entirety of the area including all of the plurality of divided small areas.

Further, in the determination of the position of the image capturing target, when coordinates of a center of gravity of the luminance of the entirety of the area are included in a first predetermined range including a center of the entirety of the area, and changes in the coordinates of the center of gravity are less than or equal to a certain change, and both a change in the luminance of the entirety of the area and a change in the luminance of, among the plurality of small areas, a small area included in a second predetermined range including the center of the entirety of the area occur, it may be determined that a predetermined portion of the image capturing target changes.

Based on the above, it is possible to determine a change in the shape of the image capturing target and/or a change in the position of the image capturing target near the center of the entirety of an area including all of a plurality of divided small areas.

Further, in the determination of the position of the image capturing target, when the changes in the coordinates of the center of gravity of the luminance of the entirety of the area are less than or equal to a certain change, and both the change in the luminance of the entirety of the area and the change in the luminance of the small area at the predetermined position among the plurality of small areas occur, it may be determined that a mouth as the image capturing target opens and closes. In the performance of the information processing, the number of times the opening and closing of the mouth determined in the determination of the position of the image capturing target is performed in a predetermined time may be calculated, and game processing corresponding to the number of times may be performed.

Based on the above, it is possible to achieve a game corresponding to the opening and closing of the mouth of a user captured near the center of the entirety of the area including all of the plurality of divided small areas.

Further, the data transmission device may further include an infrared light emission unit. The image capturing unit may be an infrared image capturing unit.

Based on the above, it is possible to determine the distance from the image capturing target using the reflection of emitted infrared light, and based on the distance, it is possible to determine the shape of the image capturing target and/or the position of the image capturing target relative to the data transmission device.

Further, the data transmission device may further include an inertial sensor. In the transmission of the transmission data, the transmission data including data acquired from the inertial sensor may be generated. In the determination of the position of the image capturing target, after it is confirmed that a change in an output of the inertial sensor is smaller than a predetermined value, a process of making the determination may be started.

Based on the above, under the condition that the motion of the data transmission device is less than or equal to a predetermined magnitude, it is possible to determine the shape of the image capturing target and/or the position of the image capturing target relative to the data transmission device.

Further, in the generation of the transmission data, the entirety of the area may be divided into a matrix, thereby setting the plurality of small areas.

Based on the above, using an area having block shapes divided into a matrix, it is possible to determine the shape of the image capturing target and/or the position of the image capturing target relative to the data transmission device.

Further, in the determination of the position of the image capturing target, based on an average value of the luminance of each of the plurality of small areas, it may be determined that a predetermined portion of the image capturing target changes.

Based on the above, based on a change in the luminance of each small area, it is possible to determine the shape and/or the position of the image capturing target.

Further, the exemplary embodiment may be carried out in the forms of a storage medium having stored therein an information processing program, an information processing apparatus, and an information processing method.

According to the exemplary embodiment, it is possible to achieve information processing with a more simple configuration.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 is a diagram showing the overall configuration of another non-limiting example of the information processing system according to the exemplary embodiment;

FIG. 10 is diagrams showing a non-limiting example of the luminance of the captured image representing the state where the user closes their mouth, and a non-limiting example of the luminance of the captured image representing the state where the user opens their mouth;

FIG. 14 is a diagram showing a non-limiting example of a data area set in a DRAM 85 of the main body apparatus 2;

DETAILED DESCRIPTION OF NON-LIMITING EXAMPLE EMBODIMENTS

A description is given below of an information processing system according to an exemplary embodiment. An example of an information processing system 1 according to the exemplary embodiment includes a main body apparatus 2 (information processing apparatus; which functions as a game apparatus main body in the exemplary embodiment) 2, a left controller 3, and a right controller 4. Each of the left controller 3 and the right controller 4 is attachable to and detachable from the main body apparatus 2. The information processing system 1 can be used as a unified apparatus obtained by attaching each of the left controller 3 and the right controller 4 to the main body apparatus 2. Further, the main body apparatus 2, the left controller 3, and the right controller 4 can also be used as separate bodies (see FIG. 2). Further, the information processing system 1 can be used in the form in which an image is displayed on the main body apparatus 2, and in the form in which an image is displayed on another display device such as a television (e.g., a stationary monitor). In the first form, the information processing system 1 can be used as a mobile apparatus (e.g., a mobile game apparatus). Further, in the second form, the information processing system 1 can be used as a stationary apparatus (e.g., a stationary game apparatus).

Figure 1:
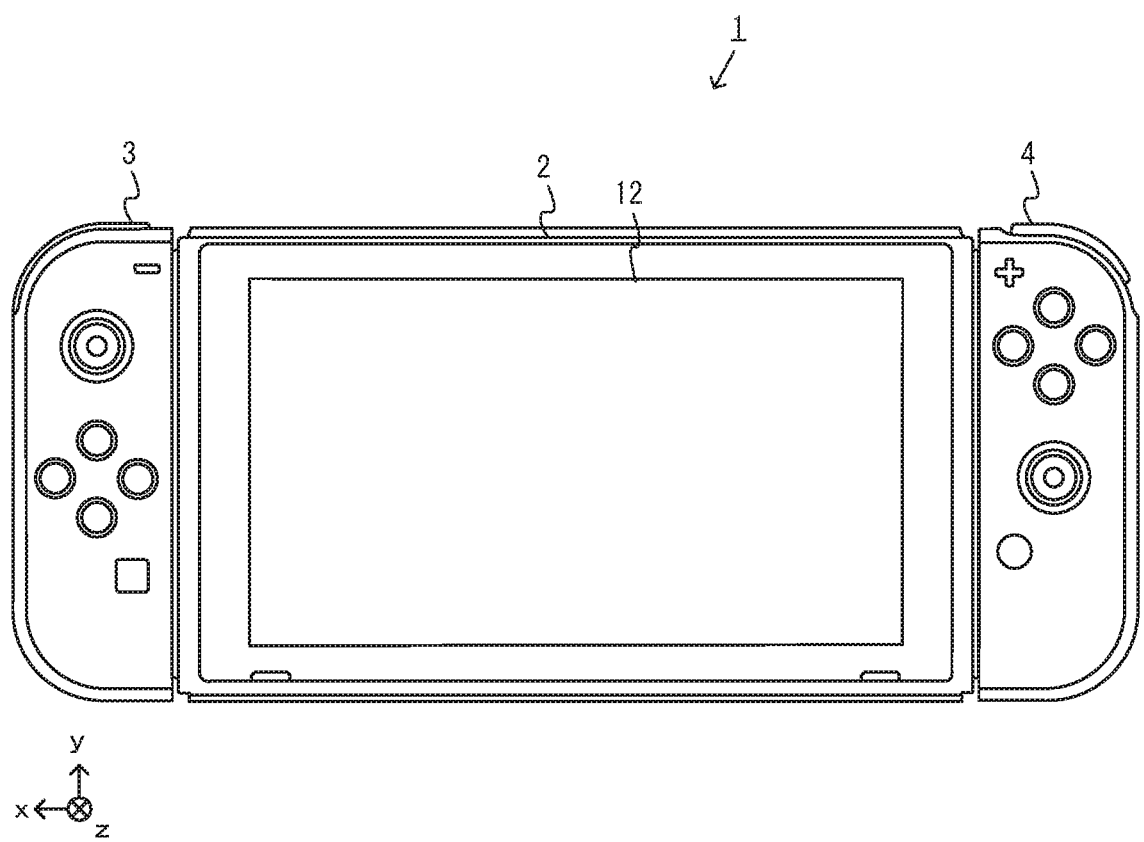
FIG. 1 is a diagram showing a non-limiting example of the state where a left controller 3 and a right controller 4 are attached to a main body apparatus 2.

FIG. 1 is a diagram showing the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the information processing system 1. The main body apparatus 2 includes a display 12. Each of the left controller 3 and the right controller 4 is an apparatus including operation sections with which a user provides inputs.

Figure 2:
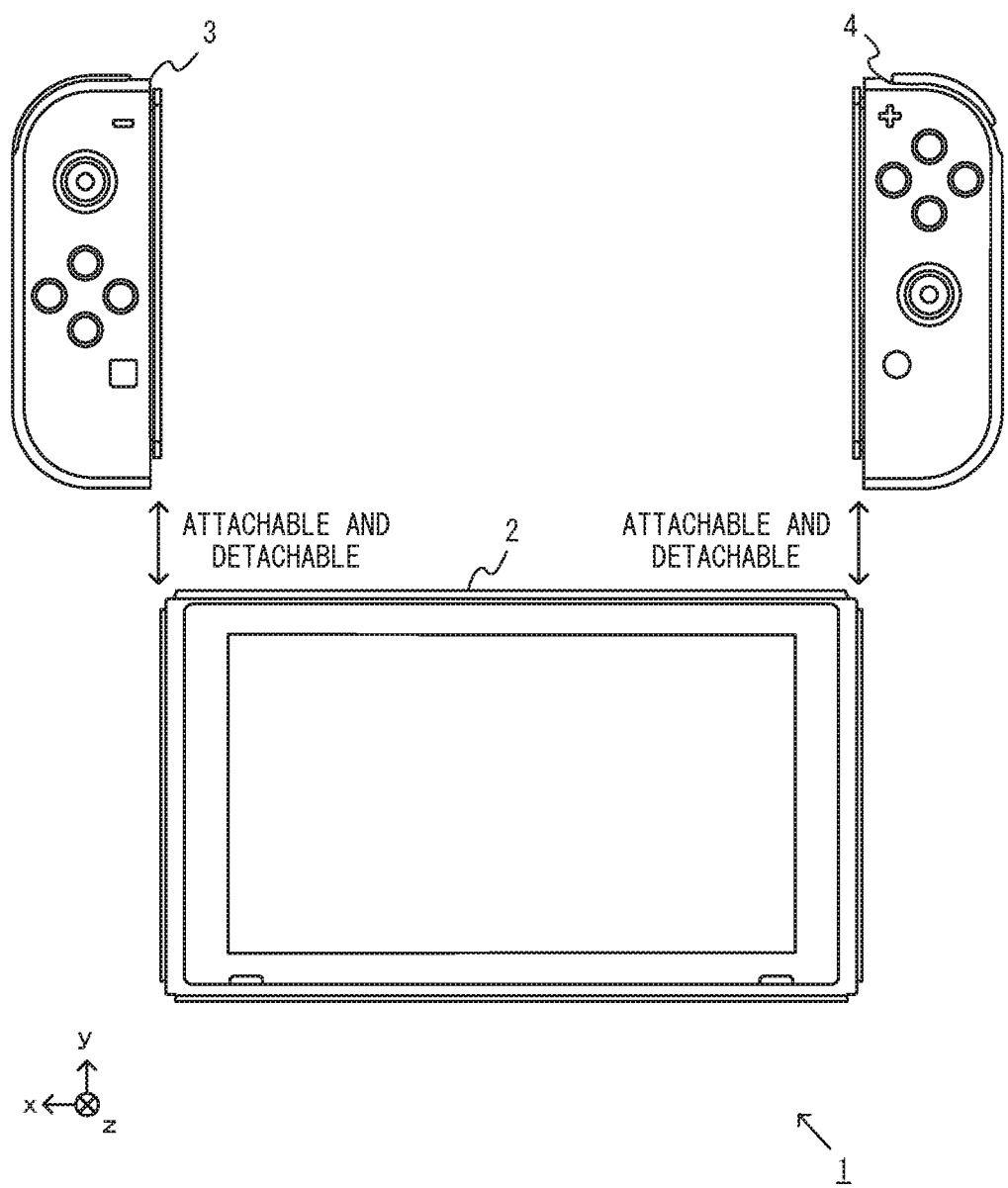
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. The left controller 3 can be attached to a left side surface (a side surface further in a positive x-axis direction shown in FIG. 1) of the main body apparatus 2 and is attachable to and detachable from the main body apparatus 2 by sliding the left controller 3 along the left side surface of the main body apparatus 2 in a y-axis direction shown in FIG. 1. Further, the right controller 4 can be attached to a right side surface (a side surface further in a negative x-axis direction shown in FIG. 1) of the main body apparatus 2 and is attachable to and detachable from the main body apparatus 2 by sliding the right controller 4 along the right side surface of the main body apparatus 2 in the y-axis direction shown in FIG. 1. It should be noted that hereinafter, the left controller 3 and the right controller 4 will occasionally be referred to collectively as "controllers". It should be noted that in the exemplary embodiment, an "operation device" operated by a single user may be a single controller (e.g., one of the left controller 3 and the right controller 4) or a plurality of controllers (e.g., both the left controller 3 and the right controller 4, or these controllers and another controller), and the "operation device" can be configured by one or more controllers. A description is given below of examples of the specific configurations of the main body apparatus 2, the left controller 3, and the right controller 4.

Figure 3:
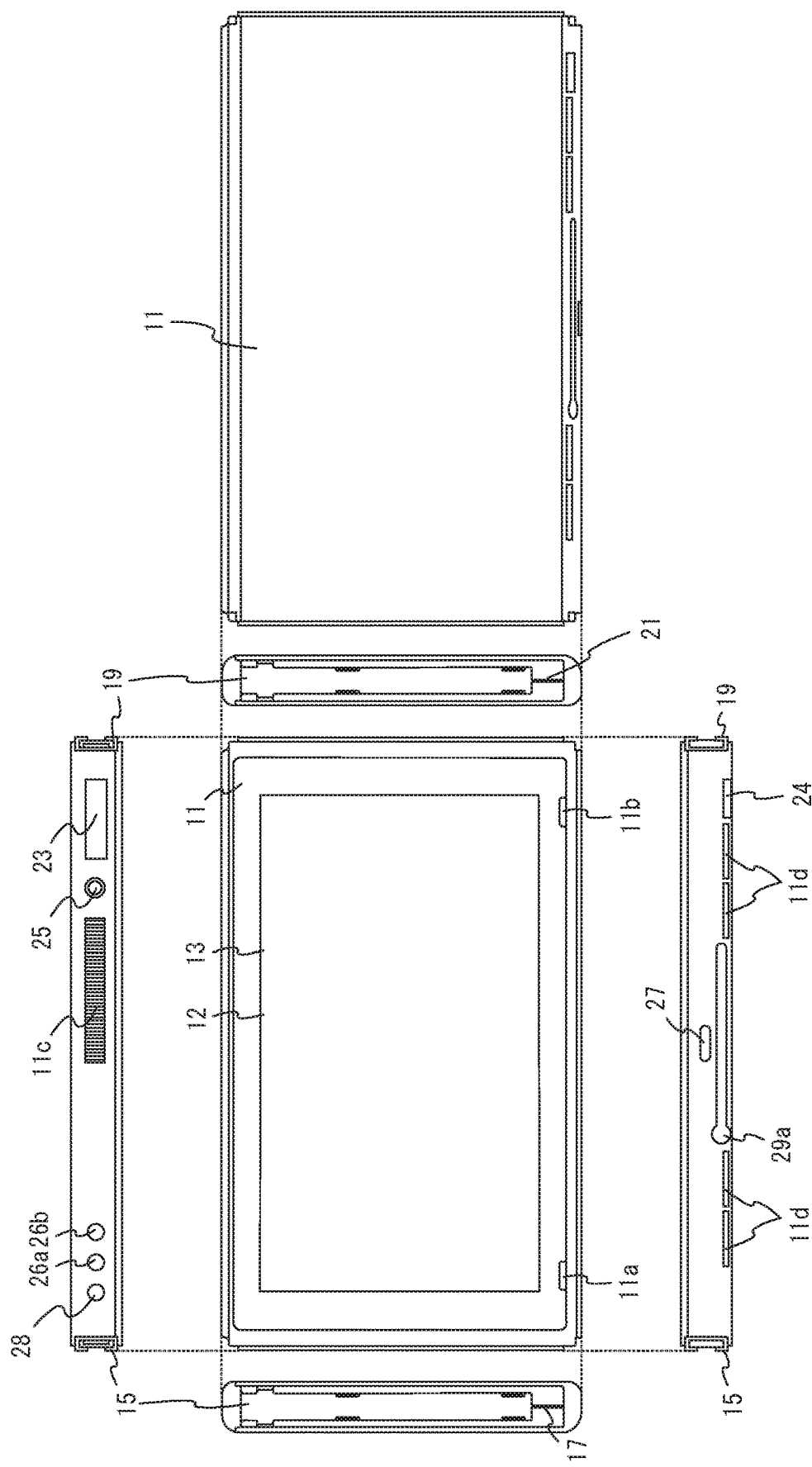
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes a generally plate-shaped housing 11. In the exemplary embodiment, a main surface of the housing 11 (in other words, a surface on a front side, i.e., a surface on which the display 12 is provided) has a roughly rectangular shape. In the exemplary embodiment, the housing 11 is shaped to be horizontally long. That is, in the exemplary embodiment, the longitudinal direction of the main surface of the housing 11 (i.e., an x-axis direction shown in FIG. 1) is referred to as a "horizontal direction" (also a "left-right direction"), the short direction of the main surface (i.e., the y-axis direction shown in FIG. 1) is referred to as a "vertical direction" (also an "up-down direction"), and a direction perpendicular to the main surface (i.e., a z-axis direction shown in FIG. 1) is referred to as a depth direction (also a "front-back direction"). The main body apparatus 2 can be used in the orientation in which the main body apparatus 2 is horizontally long. Further, the main body apparatus 2 can also be used in the orientation in which the main body apparatus 2 is vertically long. In this case, the housing 11 may be considered as being shaped to be vertically long.

It should be noted that the housing 11 may have any shape and size. As an example, the housing 11 may have a portable size. Further, the main body apparatus 2 alone or a unified apparatus obtained by attaching the left controller 3 and the right controller 4 to the main body apparatus 2 may function as a mobile apparatus. Alternatively, the main body apparatus 2 or the unified apparatus may function as a handheld apparatus. Yet alternatively, the main body apparatus 2 or the unified apparatus may function as a portable apparatus.

As shown in FIG. 3, the main body apparatus 2 includes the display 12, which is provided on the main surface of the housing 11. The display 12 displays an image (a still image or a moving image) acquired or generated by the main body apparatus 2. In the exemplary embodiment, the display 12 is a liquid crystal display apparatus (LCD). The display 12, however, may be a display apparatus of any type.

Further, the main body apparatus 2 includes a touch panel 13 on the screen of the display 12. In the exemplary embodiment, the touch panel 13 is of a type that allows a multi-touch input (e.g., an electrostatic capacitance type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

As shown in FIG. 3, the main body apparatus 2 includes a left rail member 15 on the left side surface of the housing 11. The left rail member 15 is a member for detachably attaching the left controller 3 to the main body apparatus 2. The left rail member 15 is provided so as to extend along the up-down direction on the left side surface of the housing 11. The left rail member 15 is shaped so as to be engaged with a slider (i.e., a slider 40 shown in FIG. 4) of the left controller 3, and a slide mechanism is formed of the left rail member 15 and the slider 40. With this slide mechanism, it is possible to slidably and detachably attach the left controller 3 to the main body apparatus 2.

Further, the main body apparatus 2 includes a left terminal 17. The left terminal 17 is a terminal for the main body apparatus 2 to wirelessly communicate with the left controller 3. The left terminal 17 is provided at the position where, in a case where the left controller 3 is attached to the main body apparatus 2, the left terminal 17 comes into contact with a terminal (a terminal 42 shown in FIG. 4) of the left controller 3. The specific position of the left terminal 17 is optional. In the exemplary embodiment, as shown in FIG. 3, the left terminal 17 is provided on a bottom surface of the left rail member 15. Further, in the exemplary embodiment, the left terminal 17 is provided near a lower end portion on the bottom surface of the left rail member 15 and placed at the position where the left terminal 17 is not exposed to the outside by a part of the left rail member 15.

As shown in FIG. 3, on the right side surface of the housing 11, components similar to the components provided on the left side surface are provided. That is, the main body apparatus 2 includes a right rail member 19 on the right side surface of the housing 11. The right rail member 19 is provided so as to extend along the up-down direction on the right side surface of the housing 11. The right rail member 19 is shaped so as to be engaged with a slider (i.e., a slider 62 shown in FIG. 5) of the right controller 4, and a slide mechanism is formed of the right rail member 19 and the slider 62. With this slide mechanism, it is possible to slidably and detachably attach the right controller 4 to the main body apparatus 2.

Further, the main body apparatus 2 includes a right terminal 21. The right terminal 21 is a terminal for the main body apparatus 2 to wirelessly communicate with the right controller 4. The right terminal 21 is provided at the position where, in a case where the right controller 4 is attached to the main body apparatus 2, the right terminal 21 comes into contact with a terminal (a terminal 64 shown in FIG. 5) of the right controller 4. The specific position of the right terminal 21 is optional. In the exemplary embodiment, as shown in FIG. 3, the right terminal 21 is provided on a bottom surface of the right rail member 19. Further, in the exemplary embodiment, the right terminal 21 is provided near a lower end portion on the bottom surface of the right rail member 19 and placed at the position where the right terminal 21 is not exposed to the outside by a part of the right rail member 19.

As shown in FIG. 3, the main body apparatus 2 includes a first slot 23. The first slot 23 is provided on an upper side surface of the housing 11. The first slot 23 is so shaped that a first type storage medium is attachable to the first slot 23. The first type storage medium is, for example, a dedicated storage medium (e.g., a dedicated memory card) for the information processing system 1 and an information processing apparatus of the same type as that of the information processing system 1. The first type storage medium is used to, for example, store data (e.g., saved data of an application or the like) used by the main body apparatus 2, and/or a program (e.g., a program for an application or the like) executed by the main body apparatus 2. Further, the main body apparatus 2 includes a power button 28. As shown in FIG. 3, the power button 28 is provided on the upper side surface of the housing 11. The power button 28 is a button for switching between an on-state and an off-state of the power supply of the main body apparatus 2.

The main body apparatus 2 includes a sound input/output terminal (specifically, earphone jack) 25. That is, in the main body apparatus 2, a microphone or earphones can be attached to the sound input/output terminal 25. As shown in FIG. 3, the sound input/output terminal 25 is provided on the upper side surface of the housing 11.

The main body apparatus 2 includes sound volume buttons 26a and 26b. As shown in FIG. 3, the sound volume buttons 26a and 26b are provided on the upper side surface of the housing 11. The sound volume buttons 26a and 26b are buttons for giving an instruction to adjust the volume of a sound output from the main body apparatus 2. That is, the sound volume button 26a is a button for giving an instruction to turn down the sound volume, and the sound volume button 26b is a button for giving an instruction to turn up the sound volume.

Further, in the housing 11, an exhaust hole 11c is formed. As shown in FIG. 3, the exhaust hole 11c is formed on the upper side surface of the housing 11. The exhaust hole 11c is formed to exhaust (in other words, release) heat generated within the housing 11 to outside the housing 11. That is, the exhaust hole 11c can also be said to be a heat exhaust hole.

The main body apparatus 2 includes a lower terminal 27. The lower terminal 27 is a terminal for the main body apparatus 2 to communicate with a cradle. As shown in FIG. 3, the lower terminal 27 is provided on a lower side surface of the housing 11. In a case where the main body apparatus 2 is attached to the cradle, the lower terminal 27 is connected to a terminal of the cradle. In the exemplary embodiment, the lower terminal 27 is a USB connector (more specifically, a female connector). Only the main body apparatus 2 can be mounted on the cradle in the state where the left controller 3 and the right controller 4 are detached from the main body apparatus 2. Further, as another example, the unified apparatus obtained by attaching the left controller 3 and the right controller 4 to the main body apparatus 2 can also be mounted on the cradle. Then, the cradle can communicate (through wired communication or wireless communication) with a stationary monitor (e.g., a stationary television), which is an example of an external display device separate from the main body apparatus 2. When the unified apparatus or the main body apparatus 2 alone is mounted on the cradle, the information processing system 1 can display on the stationary monitor an image acquired or generated by the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Further, the main body apparatus 2 includes a second slot 24. In the exemplary embodiment, the second slot 24 is provided on the lower side surface of the housing 11. Alternatively, in another exemplary embodiment, the second slot 24 may be provided on the same surface as the first slot 23. The second slot 24 is so shaped that a second type storage medium different from the first type storage medium is attachable to the second slot 24. The second type storage medium may be, for example, a general-purpose storage medium. For example, the second type storage medium may be an SD card. Similarly to the first type storage medium, the second type storage medium is used to, for example, store data (e.g., saved data of an application or the like) used by the main body apparatus 2, and/or a program (e.g., a program for an application or the like) executed by the main body apparatus 2.

Further, in the housing 11, an inlet hole 11d is formed. As shown in FIG. 3, the inlet hole 11d is formed on the lower side surface of the housing 11. The inlet hole 11d is formed to take (in other words, introduce) air outside the housing 11 into the housing 11. In the exemplary embodiment, the inlet hole 11d is formed on the surface opposite to the surface on which the exhaust hole 11c is formed. Thus, it is possible to efficiently release heat within the housing 11.

The shapes, the numbers, and the installation positions of the above components (specifically, the buttons, the slots, the terminals, and the like) provided in the housing 11 are optional. For example, in another exemplary embodiment, some of the power button 28 and the slots 23 and 24 may be provided on another side surface or a back surface of the housing 11. Alternatively, in another exemplary embodiment, the main body apparatus 2 may be configured not to include some of the above components.

Figure 4:
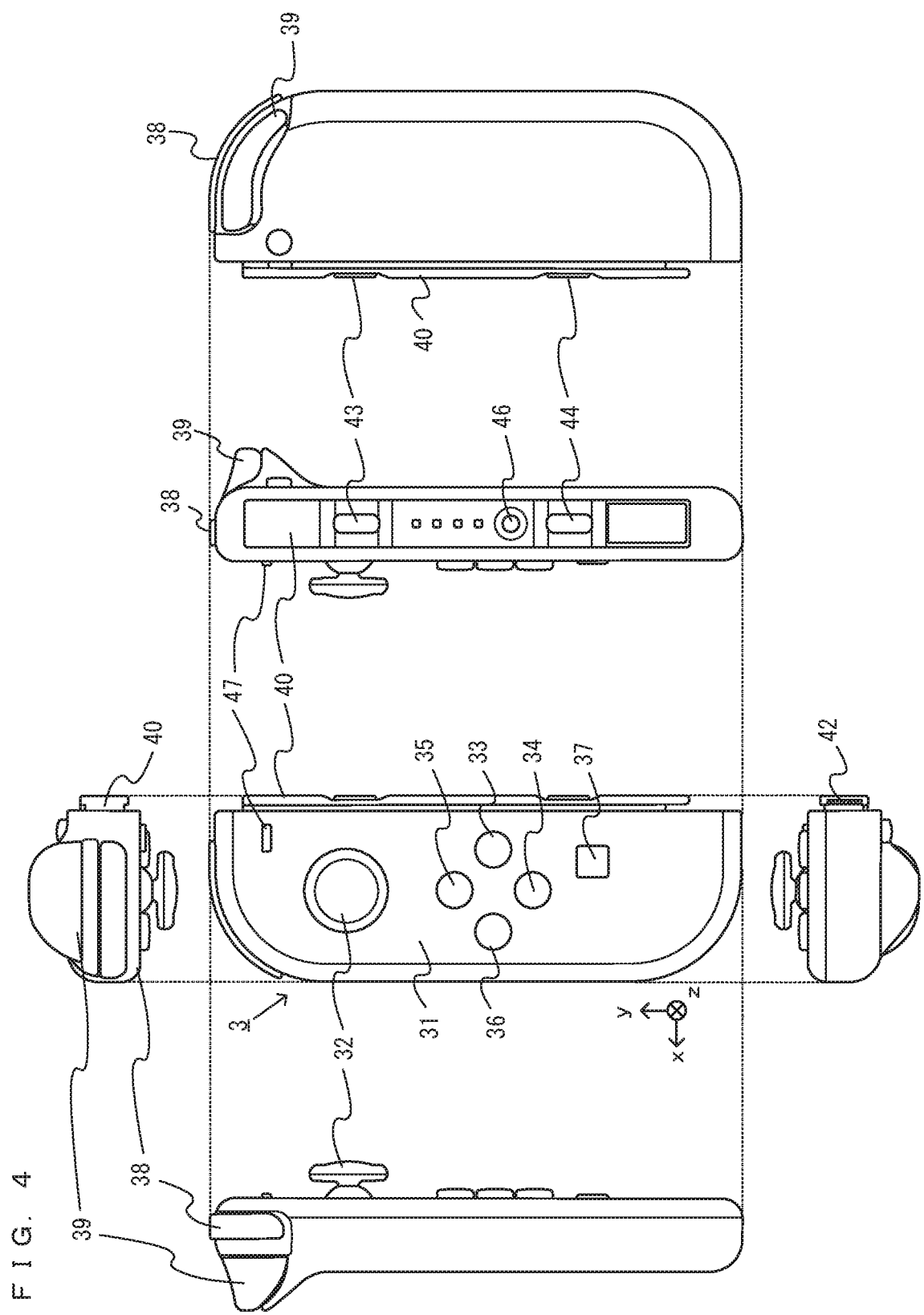
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 is generally plate-shaped. Further, a main surface of the housing 31 (in other words, a surface on a front side, i.e., a surface further in a negative z-axis direction shown in FIG. 1) has a roughly rectangular shape. Further, in the exemplary embodiment, the housing 31 is shaped to be vertically long, i.e., shaped to be long in the up-down direction (i.e., the y-axis direction shown in FIG. 1). In the state where the left controller 3 is detached from the main body apparatus 2, the left controller 3 can also be held in the orientation in which the left controller 3 is vertically long. The housing 31 has such a shape and size that, in a case where the housing 31 is held in the orientation in which the housing 31 is vertically long, the housing 31 can be held with one hand, particularly the left hand. Further, the left controller 3 can also be held in the orientation in which the left controller 3 is horizontally long. In a case where the left controller 3 is held in the orientation in which the left controller 3 is horizontally long, the left controller 3 may be held with both hands. It should be noted that the housing 31 has any shape. In another exemplary embodiment, the housing 31 may not be generally plate-shaped. Further, the housing 31 may not have a rectangular shape, and may have, for example, a semicircular shape or the like. Further, the housing 31 may not be shaped to be vertically long.

The length in the up-down direction of the housing 31 is almost the same as the length in the up-down direction of the housing 11 of the main body apparatus 2. Further, the thickness (i.e., the length in the front-back direction, in other words, the length in the z-axis direction shown in FIG. 1) of the housing 31 is almost the same as the thickness of the housing 11 of the main body apparatus 2. Thus, in a case where the left controller 3 is attached to the main body apparatus 2 (see FIG. 1), the user can hold the main body apparatus 2 and the left controller 3 with the feeling that the user holds a unified apparatus.

Further, as shown in FIG. 4, the main surface of the housing 31 is so shaped that left corner portions are more rounded than right corner portions in the main surface. That is, a connection portion between an upper side surface and a left side surface of the housing 31 and a connection portion between a lower side surface and the left side surface of the housing 31 are rounder (in other words, have greater roundness in chamfering) than a connection portion between the upper side surface and a right side surface of the housing 31 and a connection portion between the lower side surface and the right side surface of the housing 31. Thus, in a case where the left controller 3 is attached to the main body apparatus 2 (see FIG. 1), the unified apparatus has a rounded shape on its left side. This shape makes it easy for the user to hold the information processing system 1.

The left controller 3 includes an analog stick 32. As shown in FIG. 4, the analog stick 32 is provided on the main surface of the housing 31. The analog stick 32 is an example of a direction input section with which a direction can be input. The analog stick 32 includes a stick member that can be tilted in all directions parallel to the main surface of the housing 31 (i.e., 360° directions including up, down, left, right, and oblique directions). The user tilts the stick member and thereby can input a direction corresponding to the direction of the tilt (and input a magnitude corresponding to the angle of the tilt). It should be noted that the direction input section may be a directional pad, a slide stick, or the like. Further, in the exemplary embodiment, it is possible to provide an input by pressing the stick member (in a direction perpendicular to the housing 31). That is, the analog stick 32 is an input section with which a direction and a magnitude corresponding to the direction of tilt and the amount of tilt of the stick member can be input, and an input can be provided by pressing the stick member.

The left controller 3 includes four operation buttons 33 to 36 (specifically, a right direction button 33, a down direction button 34, an up direction button 35, and a left direction button 36). As shown in FIG. 4, the four operation buttons 33 to 36 are provided below the analog stick 32 on the main surface of the housing 31. It should be noted that in the exemplary embodiment, four operation buttons are provided on the main surface of the left controller 3. The number of operation buttons, however, is optional. The operation buttons 33 to 36 are used to give instructions corresponding to various programs (e.g., an OS program and an application program) executed by the main body apparatus 2. It should be noted that in the exemplary embodiment, since the operation buttons 33 to 36 can be used to input directions, the operation buttons 33 to 36 are termed the right direction button 33, the down direction button 34, the up direction button 35, and the left direction button 36. Alternatively, the operation buttons 33 to 36 may be used to give instructions other than inputting directions.

Further, the left controller 3 includes a record button 37. As shown in FIG. 4, the record button 37 is provided on the main surface of the housing 31, and more specifically, provided in a lower right area on the main surface. The record button 37 is a button for giving an instruction to save an image displayed on the display 12 of the main body apparatus 2. For example, when a game image is displayed on the display 12, the user presses the record button 37 and thereby can save, for example, in a storage section of the main body apparatus 2, the game image displayed when the record button 37 is pressed.

Further, the left controller 3 includes a "−" (minus) button 47. As shown in FIG. 4, the "−" button 47 is provided on the main surface of the housing 31, and more specifically, is provided in an upper right area on the main surface. The "−" button 47 is used to give instructions corresponding to various programs (e.g., an OS program and an application program) executed by the main body apparatus 2. The "−" button 47 is, for example, used as a select button in a game application (e.g., a button used to switch a selection item).

In a case where the left controller 3 is attached to the main body apparatus 2, operation sections (specifically, the analog stick 32 and the buttons 33 to 37 and 47) provided on the main surface of the left controller 3 are operated with, for example, the thumb of the left hand of the user holding the unified apparatus. Further, in a case where the left controller 3 is used while being held in a horizontal orientation with both hands in the state where the left controller 3 is detached from the main body apparatus 2, the above operation sections are operated with, for example, the thumbs of the left and right hands of the user holding the left controller 3. Specifically, in this case, the analog stick 32 is operated with the thumb of the left hand of the user, and the operation buttons 33 to 36 are operated with the thumb of the right hand of the user.

The left controller 3 includes a first L-button 38. Further, the left controller 3 includes a ZL-button 39. Similarly to the operation buttons 33 to 36, these operation buttons 38 and 39 are used to give instructions corresponding to various programs executed by the main body apparatus 2. As shown in FIG. 4, the first L-button 38 is provided in an upper left portion on the side surface of the housing 31. Further, the ZL-button 39 is provided in an upper left portion from the side surface to a back surface of the housing 31 (to be exact, an upper left portion when the housing 31 is viewed from its front side). That is, the ZL-button 39 is provided on the back side of the first L-button 38 (further in a positive z-axis direction shown in FIG. 1). In the exemplary embodiment, since an upper left portion of the housing 31 has a rounded shape, the first L-button 38 and the ZL-button 39 have rounded shapes corresponding to the roundness of the upper left portion of the housing 31. In a case where the left controller 3 is attached to the main body apparatus 2, the first L-button 38 and the ZL-button 39 are placed in an upper left portion of the unified apparatus.

The left controller 3 includes the slider 40 described above. As shown in FIG. 4, the slider 40 is provided so as to extend in the up-down direction on the right side surface of the housing 31. The slider 40 is shaped so as to be engaged with the left rail member 15 of the main body apparatus 2 (more specifically, grooves in the left rail member 15). Thus, the slider 40 engaged with the left rail member 15 is fixed so as not to be detached in a direction perpendicular to the slide direction (in other words, the direction in which the left rail member 15 extends).

Further, the left controller 3 includes the terminal 42 for the left controller 3 to wirelessly communicate with the main body apparatus 2. The terminal 42 is provided at the position where, in a case where the left controller 3 is attached to the main body apparatus 2, the terminal 42 comes into contact with the left terminal 17 of the main body apparatus 2 (FIG. 3). The specific position of the terminal 42 is optional. In the exemplary embodiment, as shown in FIG. 4, the terminal 42 is provided at the position where the terminal 42 is not exposed to the outside by an attachment surface of the slider 40. Further, in the exemplary embodiment, the terminal 42 is provided near a lower end portion on the attachment surface of the slider 40.

Further, the left controller 3 includes a second L-button 43 and a second R-button 44. Similarly to the other operation buttons 33 to 36, the buttons 43 and 44 are used to give instructions corresponding to various programs executed by the main body apparatus 2. As shown in FIG. 4, the second L-button 43 and the second R-button 44 are provided on the attachment surface of the slider 40. The second L-button 43 is provided above the center in the up-down direction (the y-axis direction shown in FIG. 1) on the attachment surface of the slider 40. The second R-button 44 is provided below the center in the up-down direction on the attachment surface of the slider 40. The second L-button 43 and the second R-button 44 are placed at the positions where the second L-button 43 and the second R-button 44 cannot be pressed in the state where the left controller 3 is attached to the main body apparatus 2. That is, the second L-button 43 and the second R-button 44 are buttons used in a case where the left controller 3 is detached from the main body apparatus 2. The second L-button 43 and the second R-button 44 are operated with, for example, the index finger or the middle finger of either of the left and right hands of the user holding the left controller 3 detached from the main body apparatus 2.

The left controller 3 includes a pairing button 46. In the exemplary embodiment, the pairing button 46 is used to give an instruction to perform a setting (or pairing) process regarding wireless communication between the left controller 3 and the main body apparatus 2, and give an instruction to perform the process of resetting the left controller 3. It should be noted that in another exemplary embodiment, the pairing button 46 may have only the function of either one of the setting process and the resetting process. For example, when the pairing button 46 is subjected to a short-press operation (specifically, when the pairing button 46 is pressed for a time shorter than a predetermined time), the left controller 3 executes the setting process. Further, when the pairing button 46 is subjected to a long-press operation (specifically, when the pairing button 46 continues to be pressed for the predetermined time or more), the left controller 3 executes the resetting process. In the exemplary embodiment, as shown in FIG. 4, the pairing button 46 is provided on the attachment surface of the slider 40. As described above, the pairing button 46 is placed at the position where the pairing button 46 is invisible in the state where the left controller 3 is attached to the main body apparatus 2. That is, the pairing button 46 is used in a case where the left controller 3 is detached from the main body apparatus 2.

It should be noted that in the exemplary embodiment, the buttons provided on the attachment surface of the slider 40 (specifically, the second L-button 43, the second R-button 44, and the pairing button 46) are provided so as not to protrude from the attachment surface. That is, an upper surface (in other words, a press surface) of each button is placed on the same surface as the attachment surface of the slider 40 or placed at a position more recessed than the attachment surface. Consequently, it is possible to smoothly slide the slider 40 relative to the left rail member 15 in the state where the slider 40 is attached to the left rail member 15 of the main body apparatus 2.

Figure 5:
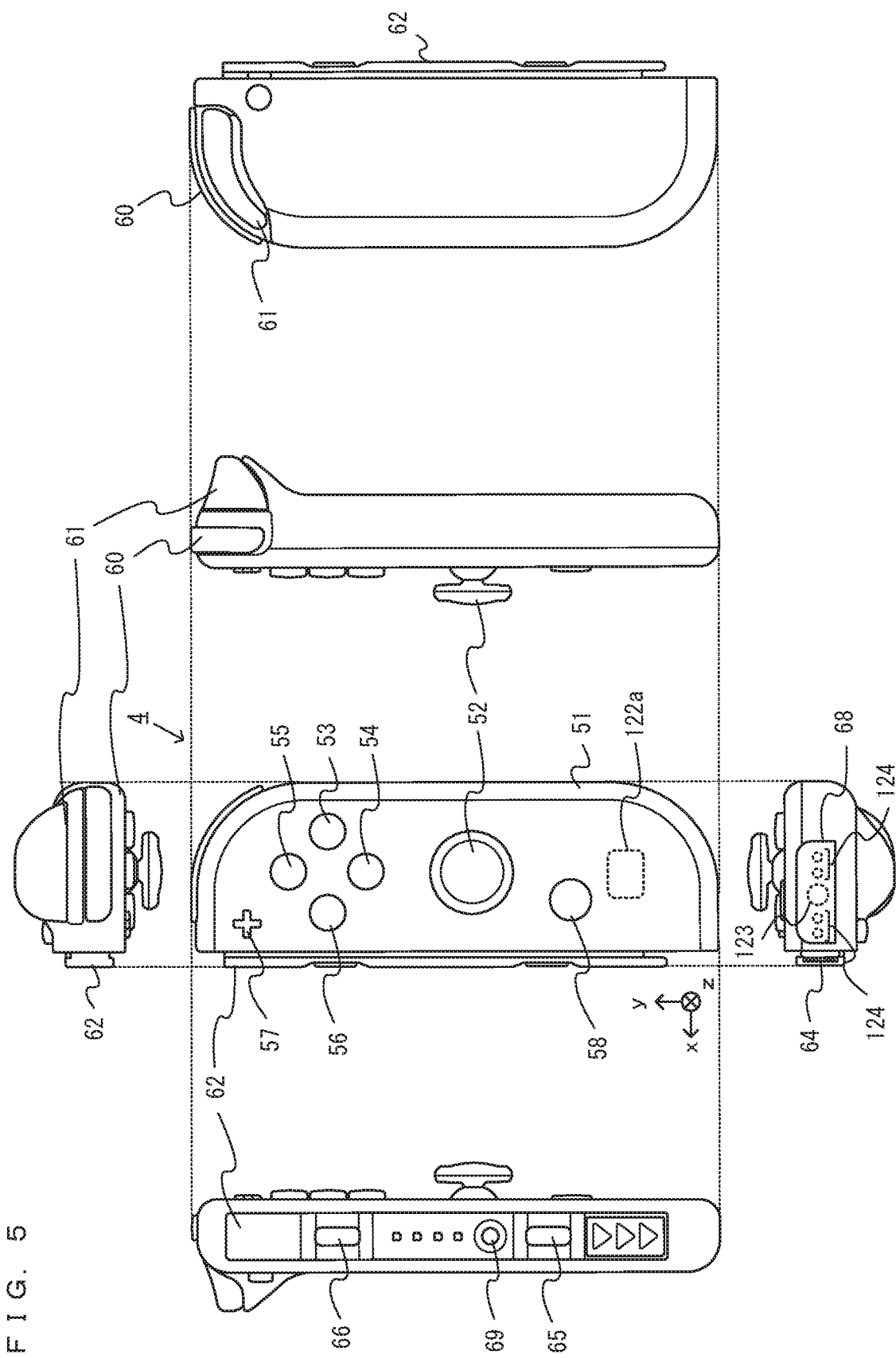
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 is generally plate-shaped. Further, a main surface of the housing 51 (in other words, a surface on a front side, i.e., a surface further in the negative z-axis direction shown in FIG. 1) has a roughly rectangular shape. Further, in the exemplary embodiment, the housing 51 is shaped to be vertically long, i.e., shaped to be long in the up-down direction. In the state where the right controller 4 is detached from the main body apparatus 2, the right controller 4 can also be held in the orientation in which the right controller 4 is vertically long. The housing 51 has such a shape and size that, in a case where the housing 51 is held in the orientation in which the housing 51 is vertically long, the housing 51 can be held with one hand, particularly the right hand. Further, the right controller 4 can also be held in the orientation in which the right controller 4 is horizontally long. In a case where the right controller 4 is held in the orientation in which the right controller 4 is horizontally long, the right controller 4 may be held with both hands.

Similarly to the housing 31 of the left controller 3, the length in the up-down direction of the housing 51 of the right controller 4 is almost the same as the length in the up-down direction of the housing 11 of the main body apparatus 2, and the thickness of the housing 51 is almost the same as the thickness of the housing 11 of the main body apparatus 2.

Thus, in a case where the right controller 4 is attached to the main body apparatus 2 (see FIG. 1), the user can hold the main body apparatus 2 and the right controller 4 with the feeling that the user holds a unified apparatus.

Further, as shown in FIG. 5, the main surface of the housing 51 is so shaped that right corner portions are more rounded than left corner portions in the main surface. That is, a connection portion between an upper side surface and a right side surface of the housing 51 and a connection portion between a lower side surface and the right side surface of the housing 51 are rounder (in other words, have greater roundness in chamfering) than a connection portion between the upper side surface and a left side surface of the housing 51 and a connection portion between the lower side surface and the left side surface of the housing 51. Thus, in a case where the right controller 4 is attached to the main body apparatus 2 (see FIG. 1), the unified apparatus has a rounded shape on its right side. This shape makes it easy for the user to hold the information processing system 1.

Similarly to the left controller 3, the right controller 4 includes an analog stick 52 as a direction input section. In the exemplary embodiment, the analog stick 52 has the same configuration as that of the analog stick 32 of the left controller 3. Further, similarly to the left controller 3, the right controller 4 includes four operation buttons 53 to 56 (specifically, an A-button 53, a B-button 54, an X-button 55, and a Y-button 56). In the exemplary embodiment, the four operation buttons 53 to 56 have the same mechanisms as those of the four operation buttons 33 to 36 of the left controller 3. As shown in FIG. 5, the analog stick 52 and the operation buttons 53 to 56 are provided on the main surface of the housing 51. It should be noted that in the exemplary embodiment, four operation buttons are provided on the main surface of the right controller 4. The number of operation buttons, however, is optional.

Here, in the exemplary embodiment, the positional relationship between the two types of operation sections (the analog stick and the operation buttons) of the right controller 4 is opposite to the positional relationship between these two types of operation sections of the left controller 3. That is, in the right controller 4, the analog stick 52 is placed below the operation buttons 53 to 56, whereas in the left controller 3, the analog stick 32 is placed above the operation buttons 33 to 36. With such placement, in a case where the left controller 3 and the right controller 4 are used by being detached from the main body apparatus 2, it is possible to use the left controller 3 and the right controller 4 with similar operation feelings.

Further, the right controller 4 includes a "+" (plus) button 57. As shown in FIG. 5, the "+" button 57 is provided on the main surface of the housing 51, and more specifically, is provided in an upper left area on the main surface. Similarly to the other operation buttons 53 to 56, the "+" button 57 is used to give instructions corresponding to various programs (e.g., an OS program and an application program) executed by the main body apparatus 2. The "+" button 57 is, for example, used as a start button in a game application (e.g., a button used to give an instruction to start a game).

The right controller 4 includes a home button 58. As shown in FIG. 5, the home button 58 is provided on the main surface of the housing 51, and more specifically, is provided in a lower left area on the main surface. The home button 58 is a button for displaying a predetermined menu screen on the display 12 of the main body apparatus 2. The menu screen is, for example, a screen on which an application specified by the user from among one or more applications that can be executed by the main body apparatus 2 can be started. The menu screen may be displayed, for example, when the main body apparatus 2 is started. In the exemplary embodiment, if the home button 58 is pressed in the state where an application is executed by the main body apparatus 2 (i.e., in the state where an image of the application is displayed on the display 12), a predetermined operation screen may be displayed on the display 12 (at this time, the menu screen may be displayed instead of the operation screen). It should be noted that the operation screen is, for example, a screen on which an instruction to end the application and display the menu screen on the display 12, an instruction to resume the application, and the like can be given.

In a case where the right controller 4 is attached to the main body apparatus 2, operation sections (specifically, the analog stick 52 and the buttons 53 to 58) provided on the main surface of the right controller 4 are operated with, for example, the thumb of the right hand of the user holding the unified apparatus. Further, in a case where the right controller 4 is used while being held in a horizontal orientation with both hands in the state where the right controller 4 is detached from the main body apparatus 2, the above operation sections are operated with, for example, the thumbs of the left and right hands of the user holding the right controller 4. Specifically, In this case, the analog stick 52 is operated with the thumb of the left hand of the user, and the operation buttons 53 to 56 are operated with the thumb of the right hand of the user.

The right controller 4 includes a first R-button 60. Further, the right controller 4 includes a ZR-button 61. As shown in FIG. 5, the first R-button 60 is provided in an upper right portion on the side surface of the housing 51. Further, the ZR-button 61 is provided in an upper right portion from the side surface to a back surface of the housing 51 (to be exact, an upper right portion when the housing 51 is viewed from its front side). That is, the ZR-button 61 is provided on the back side of the first R-button 60 (further in the positive z-axis direction shown in FIG. 1). In the exemplary embodiment, since an upper right portion of the housing 51 has a rounded shape, the first R-button 60 and the ZR-button 61 have rounded shapes corresponding to the roundness of the upper right portion of the housing 51. In a case where the right controller 4 is attached to the main body apparatus 2, the first R-button 60 and the ZR-button 61 are placed in an upper right portion of the unified apparatus.

The right controller 4 includes a slider mechanism similar to that of the left controller 3. That is, the right controller 4 includes the slider 62 described above. As shown in FIG. 5, the slider 62 is provided so as to extend in the up-down direction on the left side surface of the housing 51. The slider 62 is shaped so as to be engaged with the right rail member 19 of the main body apparatus 2 (more specifically, grooves in the right rail member 19). Thus, the slider 62 engaged with the right rail member 19 is fixed so as not to be detached in a direction perpendicular to the slide direction (in other words, the direction in which the right rail member 19 extends).

Further, the right controller 4 includes the terminal 64 for the right controller 4 to wirelessly communicate with the main body apparatus 2. The terminal 64 is provided at the position where, in a case where the right controller 4 is attached to the main body apparatus 2, the terminal 64 comes into contact with the right terminal 21 of the main body apparatus 2 (FIG. 3). The specific position of the terminal 64 is optional. In the exemplary embodiment, as shown in FIG. 5, the terminal 64 is provided at the position where the terminal 64 is not exposed to the outside by an attachment surface of the slider 62. In the exemplary embodiment, the terminal 64 is provided near a lower end portion on the attachment surface of the slider 62.

Further, similarly to the left controller 3, the right controller 4 includes a second L-button 65 and a second R-button 66. Similarly to the other operation buttons 53 to 56, the buttons 65 and 66 are used to give instructions corresponding to various programs executed by the main body apparatus 2. As shown in FIG. 5, the second L-button 65 and the second R-button 66 are provided on the attachment surface of the slider 62. The second L-button 65 is provided below the center in the up-down direction (the y-axis direction shown in FIG. 1) on the attachment surface of the slider 62. The second R-button 66 is provided above the center in the up-down direction on the attachment surface of the slider 62. Similarly to the second L-button 43 and the second R-button 44 of the left controller 3, the second L-button 65 and the second R-button 66 are buttons placed at the positions where the buttons cannot be pressed in the state where the right controller 4 is attached to the main body apparatus 2, and used in a case where the right controller 4 is detached from the main body apparatus 2. The second L-button 65 and the second R-button 66 are operated with, for example, the index finger or the middle finger of either of the left and right hands of the user holding the right controller 4 detached from the main body apparatus 2.

The right controller 4 includes a pairing button 69. Similarly to the pairing button 46 of the left controller 3, the pairing button 69 is used to give an instruction to perform a setting (or pairing) process regarding wireless communication between the right controller 4 and the main body apparatus 2, and give an instruction to perform the process of resetting the right controller 4. The setting process and the resetting process are similar to those of the left controller 3, and therefore are not described in detail here. Further, in the exemplary embodiment, as shown in FIG. 5, the pairing button 69 is provided on the attachment surface of the slider 62. That is, for a reason similar to that of the pairing button 46 of the left controller 3, the pairing button 69 is placed at the position where the pairing button 69 is invisible in the state where the right controller 4 is attached to the main body apparatus 2.

Further, also in the right controller 4, similarly to the left controller 3, the buttons provided on the attachment surface of the slider 62 (specifically, the second L-button 65, the second R-button 66, and the pairing button 69) are provided so as not to protrude from the attachment surface. Consequently, it is possible to smoothly slide the slider 62 relative to the right rail member 19 in the state where the slider 62 is attached to the right rail member 19 of the main body apparatus 2.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. It should be noted that in the example of FIG. 5, to make the infrared light emission range of the infrared light-emitting section 124 great, a plurality of infrared light-emitting sections 124 are provided, which are different in emission direction from each other. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. For example, the antenna 122a is provided at a position within the housing 51 where, when another wireless communication apparatus (e.g., an NFC tag) as a target in the short-range wireless communication is placed at the position where the wireless communication apparatus is near or in contact with a lower area of the main surface of the housing 51, the antenna 122a can perform the short-range wireless communication with the wireless communication apparatus. It should be noted that not only is the short-range wireless communication based on the NFC standard, the short-range wireless communication may also be any proximity communication (or contactless communication). Examples of the proximity communication include a communication method where a radio wave from an apparatus generates an electromotive force (e.g., by electromagnetic induction) in another apparatus.

It should be noted that the shapes, the numbers, and the installation positions of the above components (specifically, the sliders, the sticks, the buttons, and the like) provided in the housings 31 and 51 of the left controller 3 and the right controller 4 are optional. For example, in another exemplary embodiment, the left controller 3 and the right controller 4 may each include a direction input section of a type different from that of an analog stick. Further, the slider 40 or 62 may be placed at a position corresponding to the position of the rail member 15 or 19 provided on the main body apparatus 2, and for example, may be placed on the main surface or the back surface of the housing 31 or 51. Further, in another exemplary embodiment, the left controller 3 and the right controller 4 may be configured not to include some of the above components.

FIG. 6 is a block diagram showing an example of the internal configuration of the main body apparatus 2. The main body apparatus 2 includes components 81 to 98 shown in FIG. 6 in addition to the components shown in FIG. 3. Some of the components 81 to 98 may be mounted as electronic components on an electronic circuit board and accommodated in the housing 11.

The main body apparatus 2 includes a CPU (Central Processing Unit) 81. The CPU 81 is an information processing section for executing various types of information processing to be executed by the main body apparatus 2. The CPU 81 executes an information processing program (e.g., a game program) stored in a storage section (specifically, an internal storage medium such as a flash memory 84, an external storage medium attached to each of the slots 23 and 24, or the like), thereby performing various types of information processing.

The main body apparatus 2 includes the flash memory 84 and a DRAM (Dynamic Random Access Memory) 85 as examples of an internal storage medium built into the main body apparatus 2. The flash memory 84 and the DRAM 85 are connected to the CPU 81. The flash memory 84 is a memory mainly used to store various pieces of data (or programs) to be saved in the main body apparatus 2. The DRAM 85 is a memory used to temporarily store various pieces of data used for information processing.

The main body apparatus 2 includes a first slot interface (hereinafter abbreviated as "I/F") 91. Further, the main body apparatus 2 includes a second slot I/F 92. The first slot I/F 91 and the second slot I/F 92 are connected to the CPU 81. The first slot I/F 91 is connected to the first slot 23, and in accordance with an instruction from the CPU 81, reads and writes data from and to the first type storage medium (e.g., an SD card) attached to the first slot 23. The second slot I/F 92 is connected to the second slot 24, and in accordance with an instruction from the CPU 81, reads and writes data from and to the second type storage medium (e.g., a dedicated memory card) attached to the second slot 24.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN using a method compliant with the Wi-Fi standard and communicates with an external apparatus. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and the right controller 4.

The CPU 81 is connected to the left terminal 17, the right terminal 21, and the lower terminal 27. When wirelessly communicating with the left controller 3, the CPU 81 transmits data to the left controller 3 via the left terminal 17 and also receives operation data from the left controller 3 via the left terminal 17. Further, when wirelessly communicating with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. Further, in a case where the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, the user can provide inputs to the main body apparatus 2 using the plurality of left controllers 3 and the plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays on the display 12 a generated image (e.g., an image generated by executing the above information processing) and/or an externally acquired image.

The main body apparatus 2 includes a codec circuit 87 and the speakers (specifically, a left speaker and a right speaker) 88. The codec circuit 87 is connected to the speakers 88 and the sound input/output terminal 25 and also connected to the CPU 81. The codec circuit 87 is a circuit for controlling the input and output of sound data to and from the speakers 88 and the sound input/output terminal 25. That is, if receiving sound data from the CPU 81, the codec circuit 87 outputs sound signals obtained by performing D/A conversion on the sound data to the speakers 88 or the sound input/output terminal 25. Consequently, sounds are output from the speakers 88 or a sound output section (e.g., earphones) connected to the sound input/output terminal 25. Further, if receiving a sound signal from the sound input/output terminal 25, the codec circuit 87 performs A/D conversion on the sound signal and outputs sound data in a predetermined format to the CPU 81. Further, the sound volume buttons 26 are connected to the CPU 81. Based on an input to the sound volume buttons 26, the CPU 81 controls the volume of sounds output from the speakers 88 or the sound output section.

The main body apparatus 2 includes a power control section 97 and a battery 98. The power control section 97 is connected to the battery 98 and the CPU 81. Further, although not shown in FIG. 8, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components. Further, the power control section 97 is connected to the power button 28. Based on an input to the power button 28, the power control section 97 controls the supply of power to the above components. That is, in a case where the operation of turning off power supply is performed on the power button 28, the power control section 97 stops the supply of power to all or some of the above components. In a case where the operation of turning on power supply is performed on the power button 28, the power control section 97 starts the supply of power to all or some of the above components. Further, the power control section 97 outputs, to the CPU 81, information indicating an input to the power button 28 (specifically, information indicating whether or not the power button 28 is pressed).

Further, the battery 98 is connected to the lower terminal 27. In a case where an external charging apparatus (e.g., the cradle) is connected to the lower terminal 27, and power is supplied to the main body apparatus 2 via the lower terminal 27, the battery 98 is charged with the supplied power.

Further, the main body apparatus 2 includes a cooling fan 96 for releasing heat inside the main body apparatus 2. The cooling fan 96 operates to introduce air outside the housing 11 through the inlet hole 11d and also release air inside the housing 11 through the exhaust hole 11c, thereby releasing heat inside the housing 11. The cooling fan 96 is connected to the CPU 81, and the operation of the cooling fan 96 is controlled by the CPU 81. Further, the main body apparatus 2 includes a temperature sensor 95, which detects the temperature inside the main body apparatus 2. The temperature sensor 95 is connected to the CPU 81, and the detection result by the temperature sensor 95 is output to the CPU 81. Based on the detection result by the temperature sensor 95, the CPU 81 controls the operation of the cooling fan 96.

Figure 7:
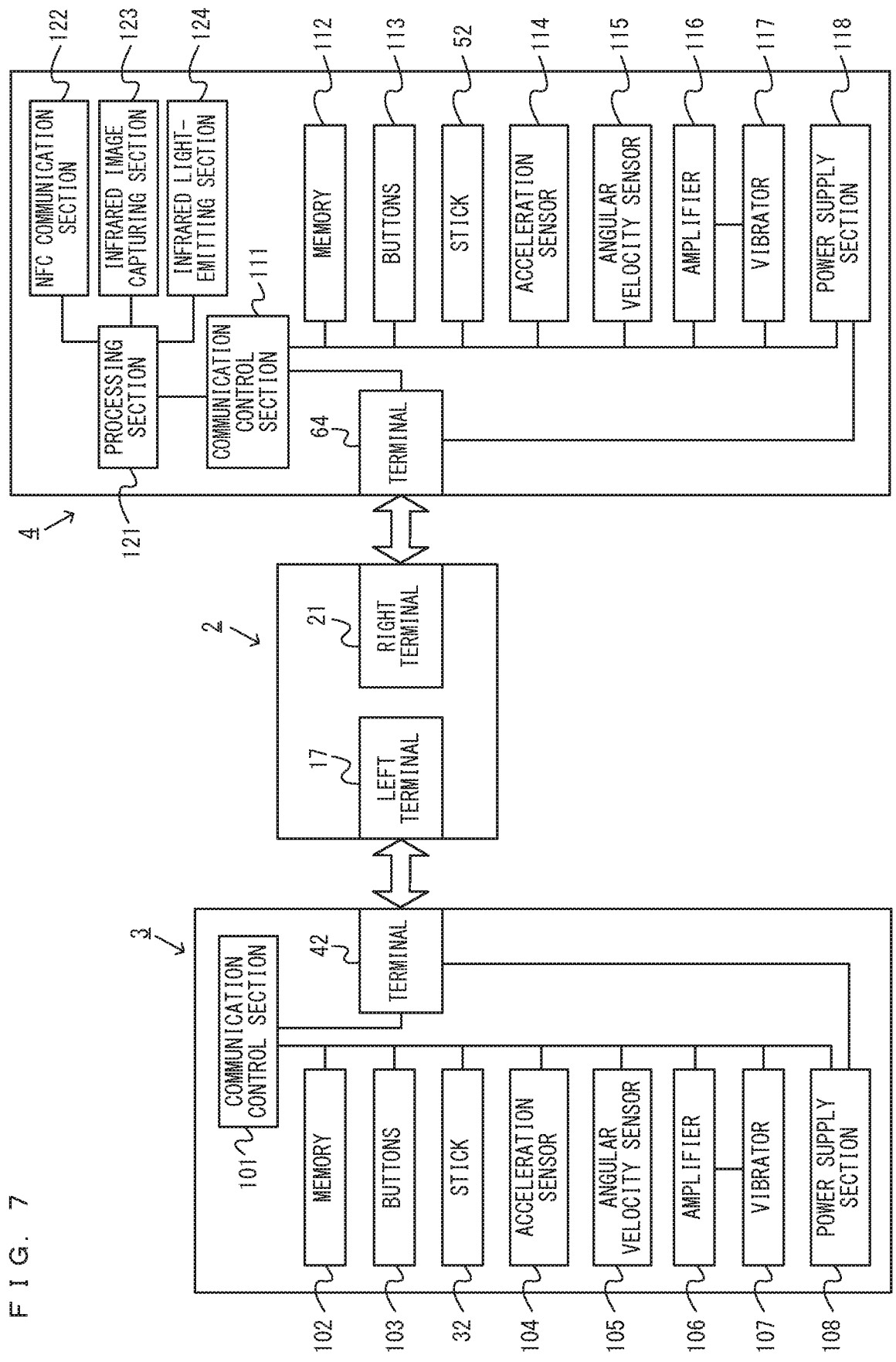
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, in a case where the left controller 3 is attached to the main body apparatus 2, the communication control section 101 communicates with the main body apparatus 2 via the terminal 42. Further, in a case where the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various types of processing.

The left controller 3 includes buttons 103 (specifically, the buttons 33 to 39, 43, 44, and 46). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes an acceleration sensor 104. In the exemplary embodiment, the acceleration sensor 104 detects the magnitudes of linear accelerations along predetermined three axial (e.g., the xyz axes shown in FIG. 4) directions. It should be noted that the acceleration sensor 104 may detect an acceleration along one axial direction or accelerations along two axial directions. Further, the left controller 3 includes an angular velocity sensor 105. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results by the acceleration sensor 104 and the angular velocity sensor 105 are output to the communication control section 101 repeatedly at appropriate timing.

The communication control section 101 acquires information regarding an input (specifically, information regarding an operation or the detection result by the sensor) from each of input sections (specifically, the buttons 103, the analog stick 32, and the sensors 104 and 105). The communication control section 101 transmits, to the main body apparatus 2, operation data including the acquired information (or information obtained by performing predetermined processing on the acquired information). It should be noted that the operation data is transmitted repeatedly, once every predetermined time. It should be noted that the interval at which information regarding an input is transmitted to the main body apparatus 2 may or may not be the same between the input sections.

The above operation data is transmitted to the main body apparatus 2, whereby the main body apparatus 2 can obtain inputs provided to the left controller 3. That is, the main body apparatus 2 can distinguish operations on the buttons 103 and the analog stick 32 based on the operation data. Further, the main body apparatus 2 can calculate information regarding the motion and/or the orientation of the left controller 3 based on the operation data (specifically, the detection results by the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the command. Here, the left controller 3 includes an amplifier 106. If receiving the above command, the communication control section 101 outputs a control signal corresponding to the command to the amplifier 106. The amplifier 106 amplifies the control signal from the communication control section 101, generates a driving signal for driving the vibrator 107, and outputs the driving signal to the vibrator 107. Consequently, the vibrator 107 operates.

The left controller 3 includes a power supply section 108. In the exemplary embodiment, the power supply section 108 includes a battery and a power control circuit. Although not shown in FIG. 9, the power control circuit is connected to the battery and also connected to components of the left controller 3 (specifically, components that receive power supplied from the battery). The power control circuit controls the supply of power from the battery to the above components. Further, the battery is connected to the terminal 42. In the exemplary embodiment, in a case where the left controller 3 is attached to the main body apparatus 2, the battery is charged via the terminal 42 with power supplied from the main body apparatus 2 under a predetermined condition.

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections (specifically, buttons 113, the analog stick 52, an acceleration sensor 114, and an angular velocity sensor 115) similar to the input sections of the left controller 3. These input sections have functions similar to those of the input sections of the left controller 3 and operate similarly to the input sections of the left controller 3.

Further, the right controller 4 includes a vibrator 117 and an amplifier 116. The vibrator 117 and the amplifier 116 operate similarly to the vibrator 107 and the amplifier 106, respectively, of the left controller 3. That is, in accordance with a command from the main body apparatus 2, the communication control section 111 causes the vibrator 117 to operate, using the amplifier 116.

The right controller 4 includes a power supply section 118. The power supply section 118 has a function similar to that of the power supply section 108 of the left controller 3 and operates similarly to the power supply section 108. That is, the power supply section 118 controls the supply of power to components that receive power supplied from a battery. In a case where the right controller 4 is attached to the main body apparatus 2, the battery is charged via the terminal 64 with power supplied from the main body apparatus 2 under a predetermined condition.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122a). The other device can operate by the developed electromotive force, and may or may not have a power supply. When the right controller 4 (the antenna 122a) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123. The infrared image capturing section 123 includes an infrared camera for capturing a portion around the right controller 4. In the exemplary embodiment, the infrared image capturing section 123 is used to capture a part of the body of the user (e.g., the face or the mouth of the user). The main body apparatus 2 and/or the right controller 4 calculate information of the captured user (e.g., information related to the luminance of a plurality of blocks into which at least the entirety of a partial area of a captured image of the user is divided or the like), and based on the calculated information, determine a change in the user. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target (i.e., the user), and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111 and also connected to an NFC communication section 122. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operation (specifically, reading, writing, or the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, via the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory, a hard disk, or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

Figure 8:
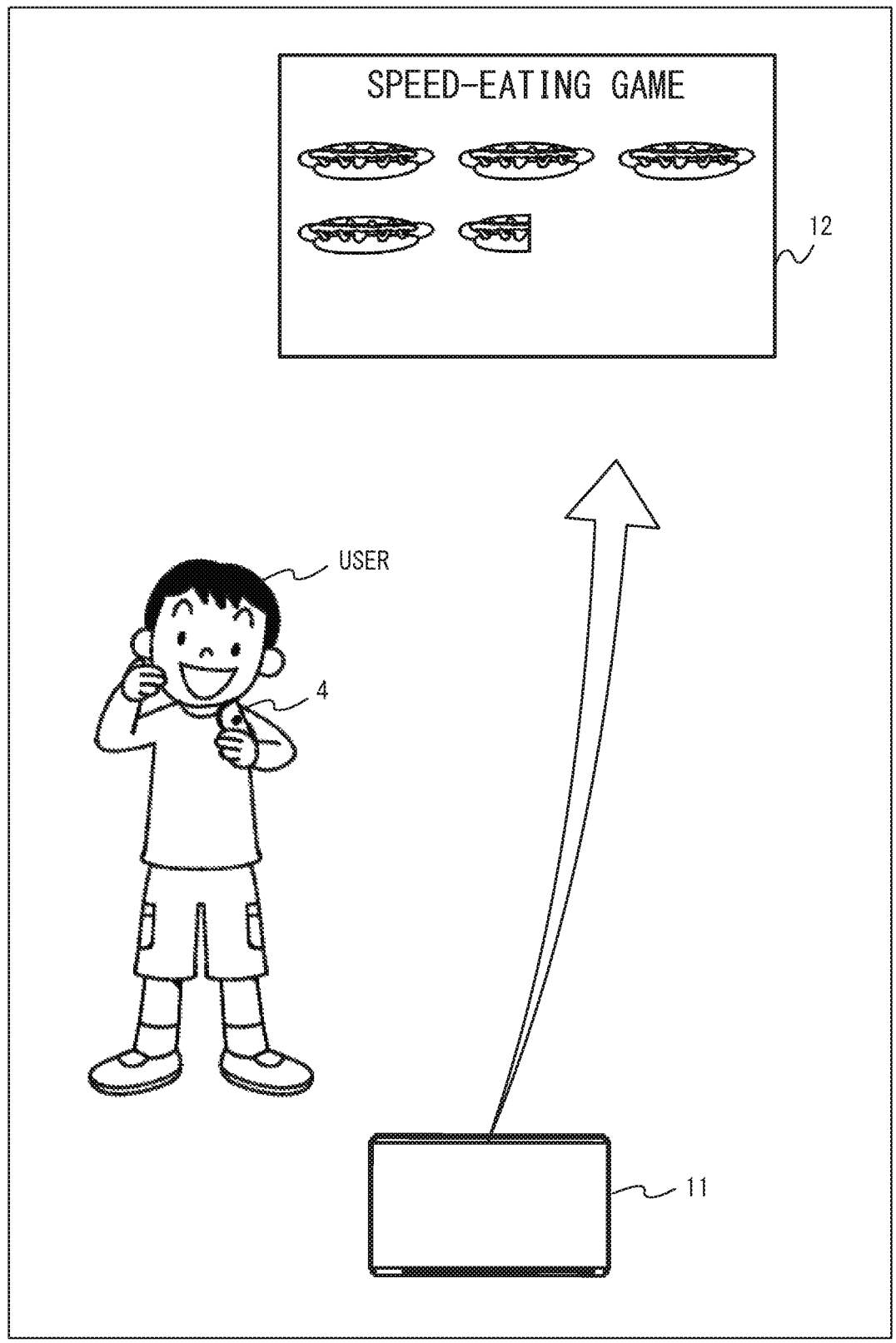
FIG. 8 is as diagram showing a non-limiting example of the state where a user plays a game by operating the right controller 4.

Next, FIG. 8 is a diagram showing an example of the state where the user plays a game by operating the right controller 4. As shown in FIG. 8, in this exemplary game, an image of a game where the user competes in speed eating by treating the right controller 4 as if eating the right controller 4 is displayed on the main body apparatus 2 (the display 12). Then, the user operating the right controller 4 opens and closes their mouth many times toward a rear end of the right controller 4 (i.e., an end portion in which the infrared image capturing section 123 is provided) and thereby can play the game where the user quickly eats food (a speed-eating game).

For example, to start the speed-eating game, an operation instruction "let's hold the controller by bringing it close to your mouth" to prepare to start the speed-eating game is displayed on the main body apparatus 2, and also a sound indicating the operation instruction is output from the main body apparatus 2. In accordance with this, the user brings a rear end surface of the right controller 4 held by the user (an end surface in the negative y-axis direction in FIG. 5, and the surface on which the window portion 68 is provided, in which the infrared image capturing section 123 and the infrared light-emitting section 124 are placed) close to the mouth of the user themselves by directing the rear end surface of the right controller 4 toward the mouth (i.e., the state where the image capturing direction of the infrared image capturing section 123 is brought close to the mouth of the user by being directed toward the mouth), thereby preparing to start the speed-eating game. Specifically, in the exemplary embodiment, when the determination is affirmative in a mouth vicinity determination process for determining that a captured image captured by the infrared image capturing section 123 and the like satisfy a plurality of conditions, it is determined that preparation for starting the speed-eating game is made.

Next, an operation instruction for notifying the user that the speed-eating game is started is displayed on the main body apparatus 2, and also a sound indicating the operation instruction is output from the main body apparatus 2. In accordance with this, in the state where the right controller 4 held by the user is directed toward the mouth of the user, the user opens and closes the mouth, whereby the game where the user competes on the speed of eating is performed. Specifically, in the exemplary embodiment, at the timing when the user closes the opened mouth, it is determined that the user takes a bite of food, and in accordance with the operation for which it is determined that the user takes a bite, the eating of the food is carried on. Then, based on the amount of food eaten by the user in a predetermined time, the result of the speed-eating game is determined.

For example, as shown in FIG. 8, the situation where food is eaten in the speed-eating game is displayed on the main body apparatus 2, also the sound of the user eating is output from the main body apparatus 2, and a vibration corresponding to the user eating is imparted to the right controller 4. In the example shown in FIG. 8, a hot dog image indicating that four hot dogs and a half are eaten is displayed on the main body apparatus 2, and every time the user opens and closes their mouth, the amount of the hot dog image increases, whereby the amount of food eaten in the speed-eating game is displayed. It should be noted that in the exemplary embodiment, when the determination is affirmative in a mouth opening/closing determination process for determining that a captured image captured by the infrared image capturing section 123 satisfies a plurality of conditions, it is determined that the user opens or closes their mouth in the speed-eating game.

Figure 9:
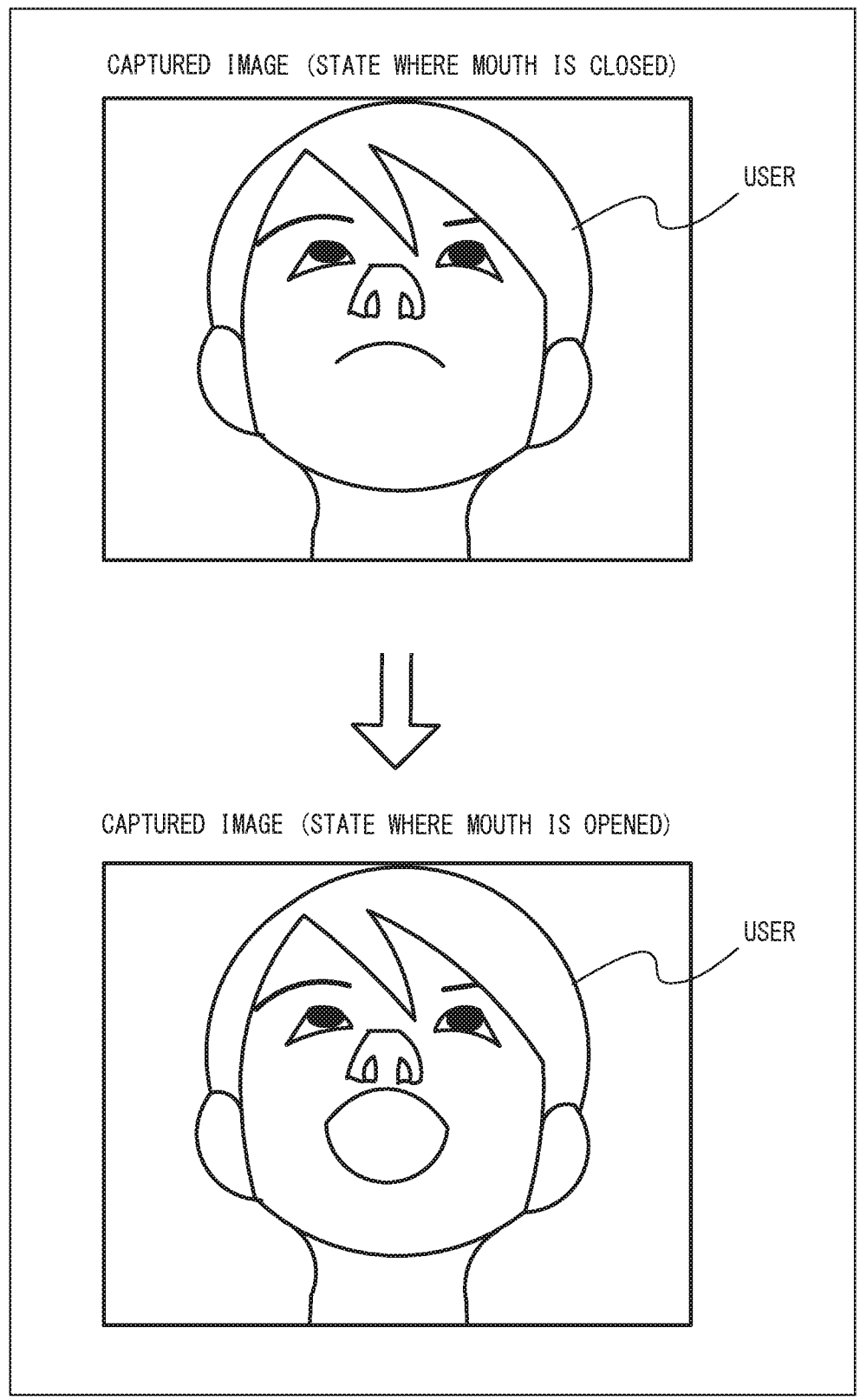
FIG. 9 is diagrams showing a non-limiting example of a captured image representing the state where the user closes their mouth and a non-limiting example of a captured image representing the state where the user opens their mouth.

Next, with reference to FIGS. 9 and 10, the details of a mouth opening/closing determination method in the speed-eating game are described. It should be noted that FIG. 9 is diagrams showing an example of a captured image representing the state where the user closes their mouth and an example of a captured image representing the state where the user opens their mouth. FIG. 10 is diagrams showing an example of the luminance of the captured image representing the state where the user closes their mouth and an example of the luminance of the captured image representing the state where the user opens their mouth.

As shown in FIG. 9, the rear end surface of the right controller 4 is brought close to the mouth of the user in the state where the image capturing direction of the infrared image capturing section 123 is directed toward the mouth of the user, the infrared image capturing section 123 becomes able to capture the face of the user as a subject. Further, in the above state, the infrared light-emitting section 124 can emit infrared light to the face of the user. Thus, infrared light emitted from the infrared light-emitting section 124 to the face of the user is reflected from the face of the user, and the reflected infrared light is captured by the infrared image capturing section 123. Here, since the image capturing direction of the infrared image capturing section 123 is directed toward the mouth of the user, the vicinity of the mouth of the user as the subject is captured near a central portion of a captured image captured by the infrared image capturing section 123. For example, as shown in the diagram in the upper part in FIG. 9, when the user is captured by the infrared image capturing section 123 in the state where the user closes their mouth, a face image of the user is obtained in which the closed mouth is captured near a central portion of a captured image. Further, as shown in the diagram in the lower part in FIG. 9, when the user is captured by the infrared image capturing section 123 in the state where the user opens their mouth, a face image of the user is obtained in which the opened mouth is captured near a central portion of a captured image. Then, when the user opens and closes their mouth, a captured image in which the user opens their mouth and a captured image in which the user closes their mouth are alternately obtained.

The captured image captured by the infrared image capturing section 123 is obtained by capturing infrared light. For example, as shown in FIG. 10, in the captured image captured by the infrared image capturing section 123, an area where the luminance of captured infrared light is relatively high (a portion indicated by a white area in FIG. 10) and an area where the luminance of captured infrared light is relatively low (a portion indicated by a grid-shaded area and a portion indicated by an oblique line area in FIG. 10) are generated. Here, in the captured image captured by the infrared image capturing section 123, reflected infrared light emitted from the infrared light-emitting section 124 and reflected from the face of the user is mainly captured. Thus, the luminance of reflected infrared light in an image capturing area indicating the face of the user (a portion indicated by a white area in FIG. 10) is high, and the luminance of reflected infrared light of an image capturing area indicating space around the face of the user (the portion indicated by the grid-shaded area in FIG. 10) is very low. The luminance of reflected infrared light of the captured image captured by the infrared image capturing section 123 is thus analyzed, whereby it is possible to distinguish between a face portion of the user and a portion other than the face of the user.

Further, when the user as the subject opens their mouth, infrared light emitted from the infrared light-emitting section 124 to the face of the user is reflected from a position in the mouth further than a portion other than the inside of the mouth. Thus, in the captured image captured by the infrared image capturing section 123, the luminance of an area where infrared light reflected from the inside of the mouth opened by the user is captured (the portion indicated by the oblique line area in the diagram in the lower part in FIG. 10) is lower than the luminance of an area where infrared light reflected from the face of the user other than the inside of the mouth is captured. On the other hand, as shown in the diagram in the upper part in FIG. 10, when the user closes their mouth, in the captured image captured by the infrared image capturing section 123, the luminance of reflected infrared light does not lower by the above reflection in the mouth. Further, as described above, since the image capturing direction of the infrared image capturing section 123 is directed toward the mouth of the user, it is possible to assume that the vicinity of the mouth of the user is captured near a central portion of the captured image captured by the infrared image capturing section 123. Thus, by paying attention to the luminance of reflected infrared light near the central portion of the captured image captured by the infrared image capturing section 123, it is possible to distinguish whether the captured user opens or closes their mouth.

In the exemplary embodiment, the captured image captured by the infrared image capturing section 123 is divided into a plurality of blocks (small areas) in a matrix, and based on information of each block, a mouth opening/closing determination and a mouth vicinity determination are made. For example, in each captured image shown in FIG. 10, an example is shown where the captured image is divided into a total of 48 blocks including six vertical blocks (a first row to a sixth row)×eight horizontal blocks (an A-th column to an H-th column). Then, in the mouth opening/closing determination for determining the opening and closing of the mouth of the user, when the captured image captured by the infrared image capturing section 123 satisfies all of a plurality of conditions, the opening/closing state of the mouth of the user is determined.

In a first condition in the mouth opening/closing determination, it is determined whether or not each of the luminances of four blocks placed in the corners of the captured image (e.g., the average luminances of the blocks) is higher than a predetermined threshold. For example, when the luminances of two or more blocks among the four blocks placed in the corners of the captured image (a first row/A-th column block, a first row/H-th column block, a sixth row/A-th column block, and a sixth row/H-th column block shown in FIG. 10) are higher than the predetermined threshold, the determination based on the first condition is negative. In other cases, the determination based on the first condition is affirmative. When the luminances of three or more blocks among the four blocks placed in the corners of the captured image are lower than the threshold, it is considered that the amount of reflected infrared light captured in these blocks is small, and a subject reflecting infrared light is not present in corner portions of the captured image. Thus, it is possible to estimate that the infrared image capturing section 123 captures a subject having a rounded shape (e.g., the face of the user).

In a second condition in the mouth opening/closing determination, it is determined whether or not the luminance center-of-gravity coordinates of the entirety of the captured image are within a predetermined range near the center of the captured image. Then, when the luminance center-of-gravity coordinates of the entirety of the captured image are within the predetermined range, the determination based on the second condition is affirmative. When the luminance center-of-gravity coordinates of the entirety of the captured image are outside the predetermined range, the determination based on the second condition is negative. When the right controller 4 is held straight by directing the image capturing direction of the infrared image capturing section 123 toward the mouth of the user and also directing a rear end portion of the right controller 4 toward the face of the user, the luminance center-of-gravity coordinates are near the center of the captured image. Thus, based on the determination using the second condition, it is possible to determine the estimation that the user holds the right controller 4.

In a third condition in the mouth opening/closing determination, it is determined whether or not the amount of change in the luminance center-of-gravity coordinates of the entirety of the captured image (e.g., the distance from the luminance center-of-gravity coordinates calculated in the previous process) is less than or equal to a predetermined threshold. Then, when the amount of change in the luminance center-of-gravity coordinates of the entirety of the captured image is less than or equal to the threshold, the determination based on the third condition is affirmative. When the amount of change in the luminance center-of-gravity coordinates of the entirety of the captured image is greater than the threshold, the determination based on the third condition is negative. Here, when the luminance of the captured image changes by the opening and closing of the mouth of the user, the change in the luminance occurs near the central portion of the captured image. Thus, it is possible that the amount of change itself in the luminance center-of-gravity coordinates of the entirety of the captured image is small. The amount of change in the luminance center-of-gravity coordinates of the entirety of the captured image is thus determined, whereby it is possible, based on the opening and closing of the mouth of the user, to estimate whether or not the luminance of the captured image changes.

In a fourth condition in the mouth opening/closing determination, it is determined whether or not changes in the luminances of blocks placed in the center of the captured image (e.g., changes in the average luminances of the blocks) are greater than a predetermined threshold. For example, when changes in the average luminances of four blocks placed in the center of the captured image (a third row/D-th column block, a third row/E-th column block, a fourth row/D-th column block, and a fourth row/E-th column block shown in FIG. 10) are equal to or greater than the predetermined threshold, the determination based on the fourth condition is affirmative. When the changes in the average luminances are less than the predetermined threshold, the determination based on the fourth condition is negative. Here, when the luminance of the captured image changes due to the opening and closing of the mouth of the user, the change in the luminance occurs near the central portion of the captured image. Thus, it is possible that changes in the luminances of the blocks placed in the center of the captured image are great. The changes in the luminances of the blocks placed in the center of the captured image are thus determined, whereby it is possible, based on the opening and closing of the mouth of the user, to estimate whether or not the luminance of the captured image changes.

In the mouth opening/closing determination, when the determination is affirmative based on all of the first to fourth conditions, the opening and closing of the mouth of the user is determined based on a change in the average luminance of the entirety of the captured image. For example, when the change in the average luminance of the entirety of the captured image (the average luminance of all the blocks) is on the increase (e.g., when the average luminance is higher than any of the average luminances calculated multiple times most recently (e.g., three consecutive times in the past)), it is determined the captured user performs the action of closing their mouth (a mouth closing action). Further, when the change in the average luminance of the entirety of the captured image is on the decrease (e.g., when the average luminance is lower than any of the average luminances calculated three consecutive times in the past), it is determined that the captured user performs the action of opening their mouth (a mouth opening action).

It should be noted that a method for determining whether the change in the average luminance of the entirety of the captured image is on the increase or on the decrease may be another method. For example, based on the comparison between the average luminances calculated four or more consecutive times in the past and the average luminance at the current moment, it may be determined whether the change in the average luminance is on the increase or on the decrease. Alternatively, when the average luminance increases a predetermined number of consecutive times, it may be determined that the change in the average luminance is on the increase. When the average luminance decreases a predetermined number of consecutive times, it may be determined that the change in the average luminance is on the decrease. Yet alternatively, based on the amount of change from the previously calculated average luminance, when the amount of change is equal to or grater than a predetermined amount, or the amount of change is equal to or greater than a predetermined amount a predetermined number of consecutive times, it may be determined whether the change in the average luminance is on the increase or on the decrease. It should be noted that the calculation results of the average luminance obtained multiple consecutive times in the past may be interrupted by the fact that the determination is negative based on any of the first to fourth conditions, or may be accumulated using, as targets, calculation opportunities except for a processing opportunity in which the determination is negative.

In the exemplary embodiment, prior to the above mouth opening/closing determination, the mouth vicinity determination for determining whether or not the user captures the vicinity of the mouth of the user themselves by making the right controller 4 still toward their mouth is made. Then, under the condition that the mouth vicinity determination is affirmative, the mouth opening/closing determination is made. Also in the mouth vicinity determination, it is determined whether or not a captured image captured by the infrared image capturing section 123 satisfies all of a plurality of conditions. Then, when the captured image satisfies all of the plurality of conditions, it is determined that the user captures the vicinity of the mouth of the user themselves by making the right controller 4 still toward their mouth. However, conditions more severe than those for the mouth opening/closing determination are added.

A first condition in the mouth vicinity determination is the same as the first condition in the mouth opening/closing determination. It is determined whether or not each of the luminances of four blocks placed in the corners of the captured image (e.g., the average luminances of the blocks) is higher than a predetermined threshold. For example, when the luminances of two or more blocks among the four blocks placed in the corners of the captured image (the first row/A-th column block, the first row/H-th column block, the sixth row/A-th column block, and the sixth row/H-th column block shown in FIG. 10) are higher than the predetermined threshold, the determination based on the first condition is negative. In other cases, the determination based on the first condition is affirmative.

In a second condition in the mouth vicinity determination, it is determined whether or not the luminance center-of-gravity coordinates of the entirety of the captured image are within a predetermined range near the center of the captured image. However, a range relatively smaller than the predetermined range used in the second condition in the mouth opening/closing determination is used. Then, when the luminance center-of-gravity coordinates of the entirety of the captured image are within the predetermined range, the determination based on the second condition is affirmative. When the luminance center-of-gravity coordinates of the entirety of the captured image are outside the predetermined range, the determination based on the second condition is negative.

In a third condition in the mouth vicinity determination, it is determined whether or not the amount of change in the luminance center-of-gravity coordinates of the entirety of the captured image (e.g., the distance from the luminance center-of-gravity coordinates calculated in the previous process) is less than or equal to a predetermined threshold. However, a value relatively smaller than the predetermined threshold used in the third condition in the mouth opening/closing determination is used. Then, when the amount of change in the luminance center-of-gravity coordinates of the entirety of the captured image is less than or equal to the threshold, the determination based on the third condition is affirmative. When the amount of change in the luminance center-of-gravity coordinates of the entirety of the captured image is greater than the threshold, the determination based on the third condition is negative.

In a fourth condition in the mouth vicinity determination, it is determined whether or not the average luminance of the entirety of the captured image is within a predetermined range. Then, when the average luminance of the entirety of the captured image is within the predetermined range, the determination based on the fourth condition is affirmative. When the average luminance of the entirety of the captured image is outside the predetermined range, the determination based on the fourth condition is negative. Here, when the user brings the right controller 4 too close to their face, the amount of reflected infrared light captured by the infrared image capturing section 123 becomes large, and the average luminance of the entirety of the captured image increases. On the other hand, when the user places the right controller 4 too far from their face, the amount of reflected infrared light captured by the infrared image capturing section 123 becomes small, and the average luminance of the entirety of the captured image decreases. In the fourth condition in the mouth vicinity determination, the determination is made to detect the state where the distance between the right controller 4 and the face of the user is too close or too far as described above. The predetermined range is set so that the determination is affirmative when the distance is within an appropriate range.

In a fifth condition in the mouth vicinity determination, it is determined whether or not the right controller 4 remains still. For example, in the determination based on the fifth condition in the mouth vicinity determination, angular velocities detected by the angular velocity sensor 115 provided in the right controller 4 are used. When the amount of change in the angular velocities is within a predetermined range in a predetermined time, the determination is affirmative on the assumption that the right controller 4 remains still. When the amount of change in the angular velocities goes out of the predetermined range in the predetermined time, the determination is negative on the assumption that the right controller 4 does not remain still.

In the mouth vicinity determination, when the determination is affirmative based on all of the first to fifth conditions, it is determined that the user captures the vicinity of the mouth of the user themselves by making the right controller 4 still toward their mouth. Then, the start of the speed-eating game is permitted. Then, after the speed-eating game is started, it is sequentially determined, based on the mouth opening/closing determination, whether or not food is eaten. The determination conditions are thus rougher after the speed-eating game is started than before the speed-eating game is started, whereby it is possible to prevent a dishonest operation before the game is started, while avoiding the situation where the game is frequently suspended due to erroneous determinations after the game is started.

It should be noted that in the above exemplary embodiment, the captured image captured by the infrared image capturing section 123 is divided into a plurality of blocks in a matrix, and based on information of each block, the mouth opening/closing determination and the mouth vicinity determination are made. Alternatively, the captured image may be divided into small areas having other shapes. For example, the plurality of blocks may be rectangles (oblongs or squares), rhombuses, or other polygons. Yet alternatively, the captured image captured by the infrared image capturing section 123 may be divided into a plurality of small areas (rectangles or rhombuses) in a cross grid. Yet alternatively, the captured image captured by the infrared image capturing section 123 may be divided into a plurality of small areas different in size and/or shape from each other. As an example, it is possible to set small areas located near the outer edges of the captured image to be relatively large, and set small areas located near the center of the captured image to be relatively small.

Further, an image for which the mouth opening/closing determination and the mouth vicinity determination are made may be the entirety of the captured image captured by the infrared image capturing section 123, or may be a partial area of a captured image (an analysis window described later) in which information is calculated from the captured image captured by the infrared image capturing section 123. In the exemplary embodiment, predetermined coordinate axes (e.g., coordinate axes including an X-axis in a horizontal direction and a Y-axis in a vertical direction) are set in an at least partial area of the captured image captured by the infrared image capturing section 123, and the image in which the coordinate axes are set is divided into predetermined blocks (e.g., 48 blocks of 8×6), and the mouth opening/closing determination and the mouth vicinity determination are made.

Next, a description is given of information regarding a captured image to be transmitted from the right controller 4 to the main body apparatus 2 (information regarding an image capturing target) so that the main body apparatus 2 makes the mouth opening/closing determination and the mouth vicinity determination. For example, the right controller 4 can calculate, in a plurality of modes (a moment mode, a clustering mode, and the like), information regarding an image capturing target captured in the captured image captured by the infrared image capturing section 123 and transmit the information to the main body apparatus 2. It should be noted that FIG. 11 is a diagram illustrating an example of information regarding an image capturing target calculated in the clustering mode.

In the moment mode, as described above, the captured image captured by the infrared image capturing section 123 is divided into a plurality of blocks, and the average luminance and the position of the center of gravity of each block are calculated. For example, predetermined coordinate axes (e.g., coordinate axes including an X-axis in a horizontal direction and a Y-axis in a vertical direction) are set in the entirety of the captured image captured by the infrared image capturing section 123, or a partial area of a captured image (an analysis window described later) in which information is calculated from the captured image captured by the infrared image capturing section 123, and the image in which the coordinate axes are set is divided into predetermined blocks (e.g., 48 blocks of 8×6). Then, using, as a processing target, pixels having luminances equal to or greater than a predetermined threshold in each block, the sum of the luminances of each block, the primary moment in the horizontal direction of each block, and the primary moment in the vertical direction of each block are calculated. Then, these calculation results are calculated as information of an image capturing target. For example, the sum of the luminances of each block is a value obtained by totaling the luminances of all the pixels in the block, and is a parameter in which the average luminance of the block is obtained by dividing the sum by the number of pixels in the block. Then, a value obtained by summing the average luminances of all the blocks is divided by the number of blocks, whereby it is possible to obtain the average luminance of the entirety (the entirety of the captured image or the partial area of the captured image as the processing target). Further, the primary moment in the horizontal direction of each block is a value obtained by totaling values obtained by multiplying the luminances of all the pixels in the block by the positions in the X-axis direction of the pixels, and is a parameter in which the position of the center of gravity in the horizontal direction of the luminance of the block is obtained by dividing the primary moment in the horizontal direction of the block by the sum of the luminances of the block. Then, a value obtained by summing the positions of the center of gravity in the horizontal direction of the luminances of all the blocks is divided by the number of blocks, whereby it is possible to obtain the position of the center of gravity in the horizontal direction of the luminance of the entirety (the entirety of the captured image or and the partial area of the captured image as the processing target).

Further, the primary moment in the vertical direction of each block is a value obtained by totaling values obtained by multiplying the luminances of all the pixels in the block by the positions in the Y-axis direction of the pixels, and is a parameter in which the position of the center of gravity in the vertical direction of the luminance of the block is obtained by dividing the primary moment in the vertical direction of the block by the sum of the luminances of the block. Then, a value obtained by summing the positions of the center of gravity in the vertical direction of the luminances of all the blocks is divided by the number of blocks, whereby it is possible to obtain the position of the center of gravity in the vertical direction of the luminance of the entirety (the entirety of the captured image or the partial area of the captured image as the processing target).

Figure 11:
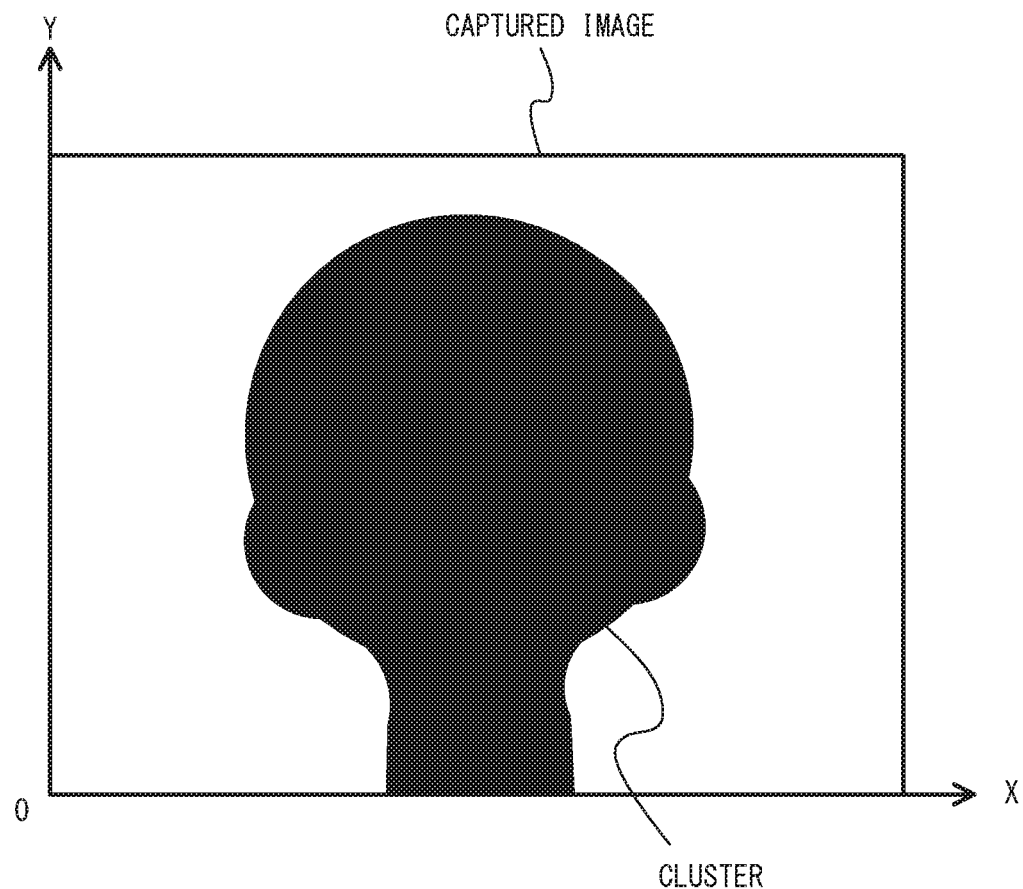
FIG. 11 is a diagram illustrating a non-limiting example of information regarding an image capturing target calculated in a clustering mode.

In FIG. 11, in the clustering mode, a cluster of high-luminance pixels are detected in the captured image captured by the infrared image capturing section 123, and the position and the size of the cluster in the captured image are calculated. For example, as shown in FIG. 11, predetermined coordinate axes (e.g., coordinate axes including an X-axis in a horizontal direction and a Y-axis in a vertical direction) are set in the entirety of the captured image captured by the infrared image capturing section 123, or a partial area of a captured image (an analysis window described later) in which information is calculated from the captured image captured by the infrared image capturing section 123. Then, a pixel group in which pixels having luminances equal to or greater than a predetermined threshold are adjacent to each other is extracted from the image in which the coordinate axes are set. Then, when the size of the pixel group is within a predetermined range, the pixel group is determined as a cluster. For example, in the case of a captured image in which the face of the user is captured, the face of the user reflecting more of the infrared light emitted from the infrared light-emitting section 124 is extracted as high-luminance pixels. Thus, the image in which the face of the user is captured is determined as a cluster. Then, in the clustering mode, the total number of clusters thus extracted is calculated, and the average luminance, the area (the number of pixels), the coordinates of the center of gravity, and the circumscribed rectangle of each cluster are also calculated. Then, these calculation results are calculated as information of an image capturing target.

It should be noted that the information of the image capturing target calculated in the moment mode and/or the clustering mode is calculated in the right controller 4 and transmitted to the main body apparatus 2. Thus, it is possible to reduce the amount of data to be transmitted to the main body apparatus 2 and also reduce the processing load on the main body apparatus 2 side, as compared with a case where data indicating the captured image itself captured by the infrared image capturing section 123 is transmitted. Further, the amount of data of the information of the image capturing target is small. Thus, it is also possible to transmit to the main body apparatus 2 the information of the image capturing target by including the information in other operation data to be transmitted from the right controller 4. Thus, it is also possible to simply configure a communication process itself between the right controller 4 and the main body apparatus 2.

It should be noted that in the clustering mode, when the position (the positions of the coordinates of the center of gravity and the circumscribed rectangle) of each cluster is calculated, the position may be calculated with respect to a reference position set in the captured image. As an example, the reference position may be set to the position of a predetermined capturing target object captured in the captured image. Then, when the captured image captured by the infrared image capturing section 123 is analyzed, image processing or the like using pattern matching is performed on the captured image, thereby calculating from the captured image the position where the capturing target object as a reference is captured. The position of each cluster is calculated with respect to the image capturing position of such a capturing target object as a reference, whereby it is possible to detect the position, the direction, the shape, and the like of the cluster with high accuracy. Further, the positional relationship between the capturing target object as a reference captured in the captured image and another image capturing target, or the shape of the captured capturing target object as a reference is used, whereby it is easy to specify the type of an image capturing target.

Figure 12:
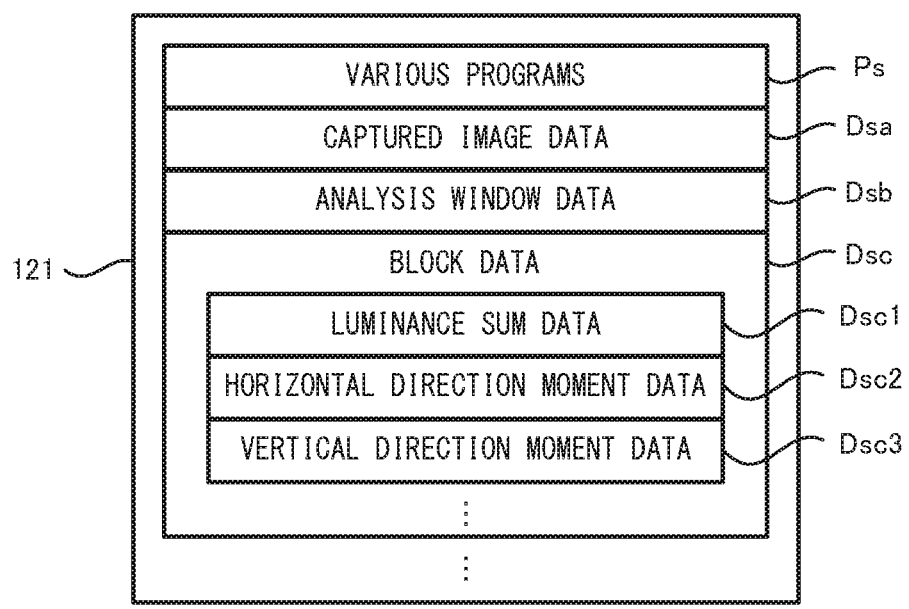
FIG. 12 is a diagram showing a non-limiting example of a data area set in a memory of the right controller 4.
Figure 13:
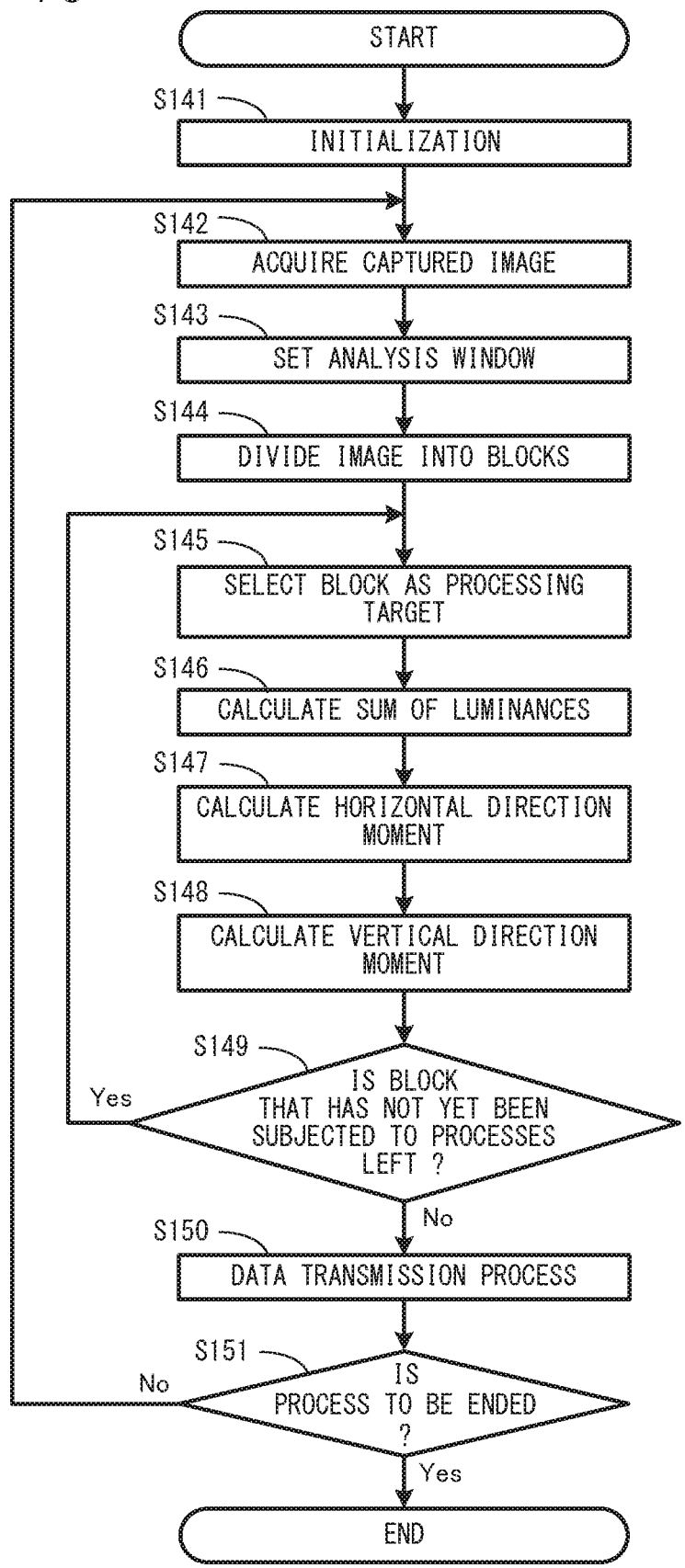
FIG. 13 is a flow chart showing a non-limiting example of an information calculation process executed by a CPU of a processing section 121.

Next, with reference to FIGS. 12 and 13, a description is given of an example of specific processing executed by the right controller 4 in the exemplary embodiment. FIG. 12 is a diagram showing an example of a data area set in a memory of the right controller 4 (e.g., a memory included in the processing section 121). It should be noted that in the memory of the right controller 4, in addition to data shown in FIG. 12, data used for other processes is also stored, but is not described in detail here. Further, in an information calculation process described later executed by the right controller 4, an example is used where the information of the image capturing target is calculated in the moment mode.

In a program storage area of the memory of the right controller 4, various programs Ps, which are executed by the processing section 121, are stored. In the exemplary embodiment, as the various programs Ps, an information calculation program for acquiring and calculating the above information based on the image capturing result of the captured image, a program for transmitting the calculated information to the main body apparatus 2, and the like are stored. It should be noted that the various programs Ps may be stored in advance in the right controller 4, or may be acquired from a storage medium attachable to and detachable from the main body apparatus 2 (e.g., the first type storage medium attached to the first slot 23 or the second type storage medium attached to the second slot 24) and stored in the memory of the right controller 4, or may be acquired from another apparatus via a network such as the Internet and stored in the memory of the right controller 4. The processing section 121 executes the various programs Ps stored in the memory of the right controller 4.

Further, in a data storage area of the memory of the right controller 4, various pieces of data used for processes executed by the processing section 121 are stored. In the exemplary embodiment, in the memory of the right controller 4, captured image data Dsa, analysis window data Dsb, block data Dsc, and the like are stored.

The captured image data Dsa is data indicating the captured image captured by the infrared image capturing section 123. In the exemplary embodiment, the infrared image capturing section 123 performs an image capturing process in a cycle based on an instruction from the processing section 121, and the captured image data Dsa is appropriately updated using this captured image. It should be noted that the update cycle of the captured image data Dsa may be such that the captured image data Dsa is updated every cycle of the processing executed by the processing section 123 and/or the processing executed by the CPU 81 described later, or may be updated every cycle in which the captured image is captured.

The analysis window data Dsb is data indicating an image of, in the captured image stored in the captured image data Dsa, a range to be analyzed (an analysis window) to calculate information based on the image capturing result.

The block data Dsc is data indicating information regarding the luminance of each of blocks set by dividing the analysis window. The block data Dsc includes, with respect to each block, luminance sum data Dsc1, horizontal direction moment data Dsc2, vertical direction moment data Dsc3, and the like. The luminance sum data Dsc1 is data indicating a value obtained by totaling the luminances of all the pixels in the block. The horizontal direction moment data Dsc2 is data indicating a value obtained by totaling values (the primary moment in the horizontal direction) obtained by multiplying the luminances of all the pixels in the block by the horizontal direction coordinate values (the positions in the X-axis direction) of the pixels. The vertical direction moment data Dsc3 is data indicating a value obtained by totaling values (the primary moment in the vertical direction) obtained by multiplying the luminances of all the pixels in the block by the vertical direction coordinate values (the positions in the Y-axis direction) of the pixels.

Next, a description is given of a detailed example of the process of calculating information based on the image capturing result of the captured image (hereinafter referred to simply as an "information calculation process") in the exemplary embodiment. FIG. 13 is a flow chart showing an example of the information calculation process executed by the CPU of the processing section 121. In the exemplary embodiment, a series of processes shown in FIG. 13 is performed by the CPU of the processing section 121 executing the information calculation program and the like included in the various programs Ps. Further, the information calculation process shown in FIG. 13 is started at any timing.

It should be noted that the processes of all of the steps in the flow chart shown in FIG. 13 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU of the processing section 121 performs the processes of all of the steps in the flow charts. Alternatively, a processor or a dedicated circuit other than the CPU of the processing section 121 may perform the processes of some of the steps in the flow charts. Yet alternatively, part of the processing performed by the right controller 4 may be executed by another information processing apparatus capable of communicating with the right controller 4 (e.g., the main body apparatus 2 or a server capable of communicating with the main body apparatus 2 via a network). That is, all the processes shown in FIG. 13 may be executed by the cooperation of a plurality of information processing apparatuses including the right controller 4.

In FIG. 13, the CPU of the processing section 121 performs initialization in the information calculation process (step S141), and the processing proceeds to the next step. For example, in the initialization, the CPU of the processing section 121 initializes parameters for performing the processing described below. Further, in the initialization, the CPU of the processing section 121 initializes, in the captured image, a range to be analyzed (an analysis window) to calculate information based on the image capturing result. Further, in the initialization, the CPU of the processing section 121 sets predetermined coordinate axes (e.g., coordinate axes including an X-axis in a horizontal direction and a Y-axis in a vertical direction) in the analysis window. Then, the CPU of the processing section 121 also divides the image in which the coordinate axes are set into predetermined blocks (e.g., 48 blocks of 8×6), thereby setting the predetermined blocks. It should be noted that the range of the analysis window may be set based on an instruction from the main body apparatus 2, or may be determined in advance. Alternatively, a plurality of ranges of the analysis window may be set. In this case, information based on the image capturing result is chronologically calculated with respect to each sequentially different analysis window.

Next, the CPU of the processing section 121 acquires the captured image captured by the infrared image capturing section 123 (step S142), and the processing proceeds to the next step. For example, the CPU of the processing section 121 acquires the captured image from the infrared image capturing section 123, thereby updating the captured image data Dsa.

Next, the CPU of the processing section 121 sets the analysis window (step S143), and the processing proceeds to the next step. For example, based on the initialized range of the analysis window, the CPU of the processing section 121 clips an image in the analysis window from the captured image stored in the captured image data Dsa and updates the analysis window data Dsb using the clipped image.

Next, the CPU of the processing section 121 divides the image in the analysis window, thereby setting a plurality of blocks (step S144), and the processing proceeds to the next step. For example, the CPU of the processing section 121 sets predetermined coordinate axes (e.g., coordinate axes including an X-axis in a horizontal direction and a Y-axis in a vertical direction) in the image stored in the analysis window data Dsb and also divides the image in which the coordinate axes are set into predetermined blocks (e.g., 48 blocks of 8×6).

Next, the CPU of the processing section 121 selects a block as a processing target in the following processing from the blocks set in the above step S144 (step S145), and the processing proceeds to the next step. For example, the CPU of the processing section 121 selects a block as a processing target from the blocks set in the above step S144, in the order from the upper left block (the first row/A-th column block shown in FIG. 10) to the lower right block (the sixth row/H-th column block shown in FIG. 10).

Next, the CPU of the processing section 121 calculates the sum of the luminances of the block as the processing target selected in the above step S145 (step S146), and the processing proceeds to the next step. For example, the CPU of the processing section 121 totals the luminances of all the pixels in the block as the processing target, thereby calculating the sum of the luminances. Then, the CPU of the processing section 121 updates the luminance sum data Dsc1 corresponding to the block as the processing target, using a value indicating the sum.

Next, the CPU of the processing section 121 calculates the horizontal direction moment of the block as the processing target selected in the above step S145 (step S147), and the processing proceeds to the next step. For example, the CPU of the processing section 121 calculates the primary moment in the horizontal direction by totaling values obtained by multiplying the luminances of all the pixels in the block as the processing target by the positions in the X-axis direction of the pixels, and updates the horizontal direction moment data Dsc2 corresponding to the block as the processing target, using a value indicating the moment.

Next, the CPU of the processing section 121 calculates the vertical direction moment of the block as the processing target selected in the above step S145 (step S148), and the processing proceeds to the next step. For example, the CPU of the processing section 121 calculates the primary moment in the vertical direction by totaling values obtained by multiplying the luminances of all the pixels in the block as the processing target by the positions in the Y-axis direction of the pixels, and updates the vertical direction moment data Dsc3 corresponding to the block as the processing target, using a value indicating the moment.

Next, the CPU of the processing section 121 determines whether or not a block that has not been subjected to the processes of the above steps S145 to S148 is left in the image in the analysis window (step S149). Then, when a block that has not yet been subjected to the processes is left, the processing returns to the above step S145, and the process of step S145 is repeated. On the other hand, when a block that has not yet been subjected to the processes is not left, the processing proceeds to step S150.

In step S150, the CPU of the processing section 121 performs the process of transmitting data indicating information based on the image capturing result of the captured image to the main body apparatus 2, and the processing proceeds to the next step. For example, using the block data Dsc, the CPU of the processing section 121 generates data to be transmitted to the main body apparatus 2, and outputs the generated data to the communication control section 111. Consequently, the communication control section 111 generates, as operation data, information based on the image capturing result of the captured image together with other operation data (button operation data, acceleration data, angular velocity data, and the like) and transmits the operation data to the main body apparatus 2 in each predetermined transmission cycle.

Next, the CPU of the processing section 121 determines whether or not the information calculation process is to be ended (step S151). Examples of a condition for ending the information calculation process in the above step S151 include: the fact that an instruction to end the information calculation process is received from the main body apparatus 2; the fact that the user performs the operation of ending the information calculation process; and the like. When the information calculation process is not to be ended, the processing returns to the above step S142, and the process of step S142 is repeated. When the information calculation process is to be ended, the processing of this flow chart ends. Hereinafter, the series of processes of steps S142 to S151 is repeatedly executed until it is determined in step S151 that the information calculation process is to be ended.

It should be noted that in the information calculation process, an example has been used where the sum of the luminances of each block, the primary moment in the horizontal direction of each block, and the primary moment in the vertical direction of each block are calculated as the information of the image capturing target. Alternatively, information in another form may be calculated as the information of the image capturing target and transmitted from the right controller 4 to the main body apparatus 2. In the exemplary embodiment, the sum of the luminances of each block is transmitted. Thus, on the main body apparatus 2 side, the sums of the luminances of all the blocks are totaled and divided by the number of all the pixels, whereby it is possible to obtain the average luminance of the entirety of an area including all of the plurality of divided blocks. In another exemplary embodiment, information at least allowing the calculation of the luminances of at least some of a plurality of divided blocks and the luminance of the entirety of an area including all of the plurality of divided blocks may be transmitted from the right controller 4 to the main body apparatus 2. For example, the average luminance of the entirety of the area including all of the plurality of divided blocks and the sum of the luminances may be calculated and transmitted from the right controller 4 to the main body apparatus 2, or the average luminance of each block may be calculated and transmitted from the right controller 4 to the main body apparatus 2. Further, in the information calculation process, the primary moment in the horizontal direction of each block and the primary moment in the vertical direction of each block are calculated and transmitted from the right controller 4 to the main body apparatus 2. Alternatively, information in another form may be transmitted from the right controller 4 to the main body apparatus 2 so long as the information allows the obtaining of the coordinates of the center of gravity of the luminance of each block. For example, the coordinates themselves of the center of gravity of the luminance of each block may be calculated and transmitted from the right controller 4 to the main body apparatus 2. As another example, the coordinates of the center of gravity of the luminance of the entirety of the area including all of the plurality of divided blocks may be calculated and transmitted from the right controller 4 to the main body apparatus 2.

Next, with reference to FIGS. 14 to 17, a description is given of an example of specific processing executed by the main body apparatus 2 according to the exemplary embodiment. FIG. 14 is a diagram showing an example of a data area set in the DRAM 85 of the main body apparatus 2. It should be noted that in the DRAM 85, in addition to data shown in FIG. 14, data used for other processes is also stored, but is not described in detail here. Further, in information processing described later executed by the main body apparatus 2, an example is used where the information of the image capturing target calculated in the moment mode is acquired.

In a program storage area of the DRAM 85, various programs Pa, which are executed by the main body apparatus 2, are stored. In the exemplary embodiment, as the various programs Pa, a communication program for wirelessly communicating with the left controller 3 and/or the right controller 4, an application program for performing information processing (e.g., game processing) based on data acquired from the left controller 3 and/or the right controller 4, and the like are stored. It should be noted that the various programs Pa may be stored in advance in the flash memory 84, or may be acquired from a storage medium attachable to and detachable from the main body apparatus 2 (e.g., the first type storage medium attached to the first slot 23 or the second type storage medium attached to the second slot 24) and stored in the DRAM 85, or may be acquired from another apparatus via a network such as the Internet and stored in the DRAM 85. The CPU 81 executes the various programs Pa stored in the DRAM 85.

Further, in a data storage area of the DRAM 85, various pieces of data used for processes such as a communication process, information processing, and the like executed by the main body apparatus 2 are stored. In the exemplary embodiment, in the DRAM 85, operation data Da, block luminance data Db, average luminance data Dc, center luminance data Dd, luminance center-of-gravity coordinate data De, mouth opening flag data Df, orientation change data Dg, object data Dh, image data Di, and the like are stored.

The operation data Da is operation data appropriately acquired from the right controller 4. As described above, operation data transmitted from the right controller 4 includes information regarding an input (specifically, information regarding an operation or the detection result of each sensor) from each input section (specifically, each button, an analog stick, and each sensor) and information based on the image capturing result of the captured image captured by the infrared image capturing section 123. In the exemplary embodiment, operation data is transmitted from the right controller 4 in a predetermined cycle through wireless communication, and the operation data Da is appropriately updated using the received operation data. It should be noted that the update cycle of the operation data Dc may be such that the operation data Da is updated every frame, which is the cycle of the processing described later performed by the main body apparatus 2, or is updated every cycle in which operation data is transmitted through the above wireless communication. The operation data Da includes button operation data Da1, block data Da2, angular velocity data Da3, and the like. The button operation data Da1 is data indicating information regarding an input from each button or an analog stick of the right controller 4. The block data Da2 is data indicating information of each block calculated by the processing section 121 of the right controller 4. The angular velocity data Da3 is data indicating information regarding angular velocities generated in the right controller 4 detected by the angular velocity sensor 115 of the right controller 4. For example, the angular velocity data Da3 includes data indicating angular velocities about the xyz axes generated in the right controller 4.

The block luminance data Db is data indicating the average luminance of each block. The average luminance data Dc is data indicating the average luminance of the entirety of the block. The center luminance data Dd is data indicating the average luminance of a block placed near the center in the entirety of the block. The luminance center-of-gravity coordinate data De is data indicating the luminance center-of-gravity coordinates of the entirety of the block.

The mouth opening flag data Df is data indicating a mouth opening flag, which is set to on when it is determined that the captured user performs the action of opening their mouth, and is set to off when it is determined that the captured user performs the action of closing their mouth.

The orientation change data Dg is data indicating the amount of change in the orientation of the right controller 4 in real space. For example, the orientation change data Dg includes data indicating a change in the orientation of the right controller 4 about the xyz axis direction, and the like.

The object data Dh is data regarding a virtual object (e.g., data indicating the type, the amount, and the like of the virtual object) displayed on a display device (e.g., the display 12). The image data Di is data for displaying images (e.g., an image of the virtual object, an image of another object, a background image, and the like) on the display device when a game is performed.

Figure 15:
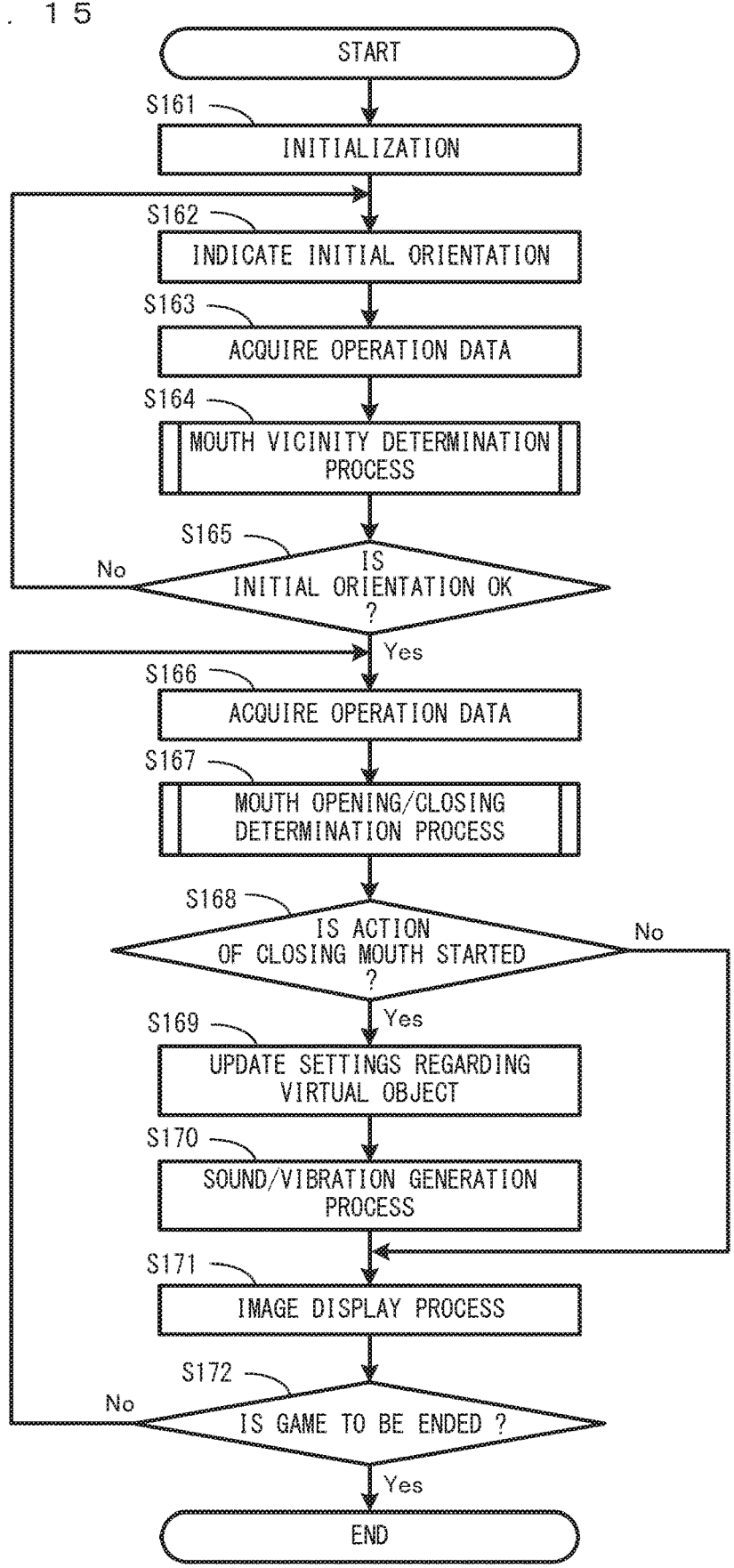
FIG. 15 is a flow chart showing a non-limiting example of information processing executed by the main body apparatus 2.
Figure 16:
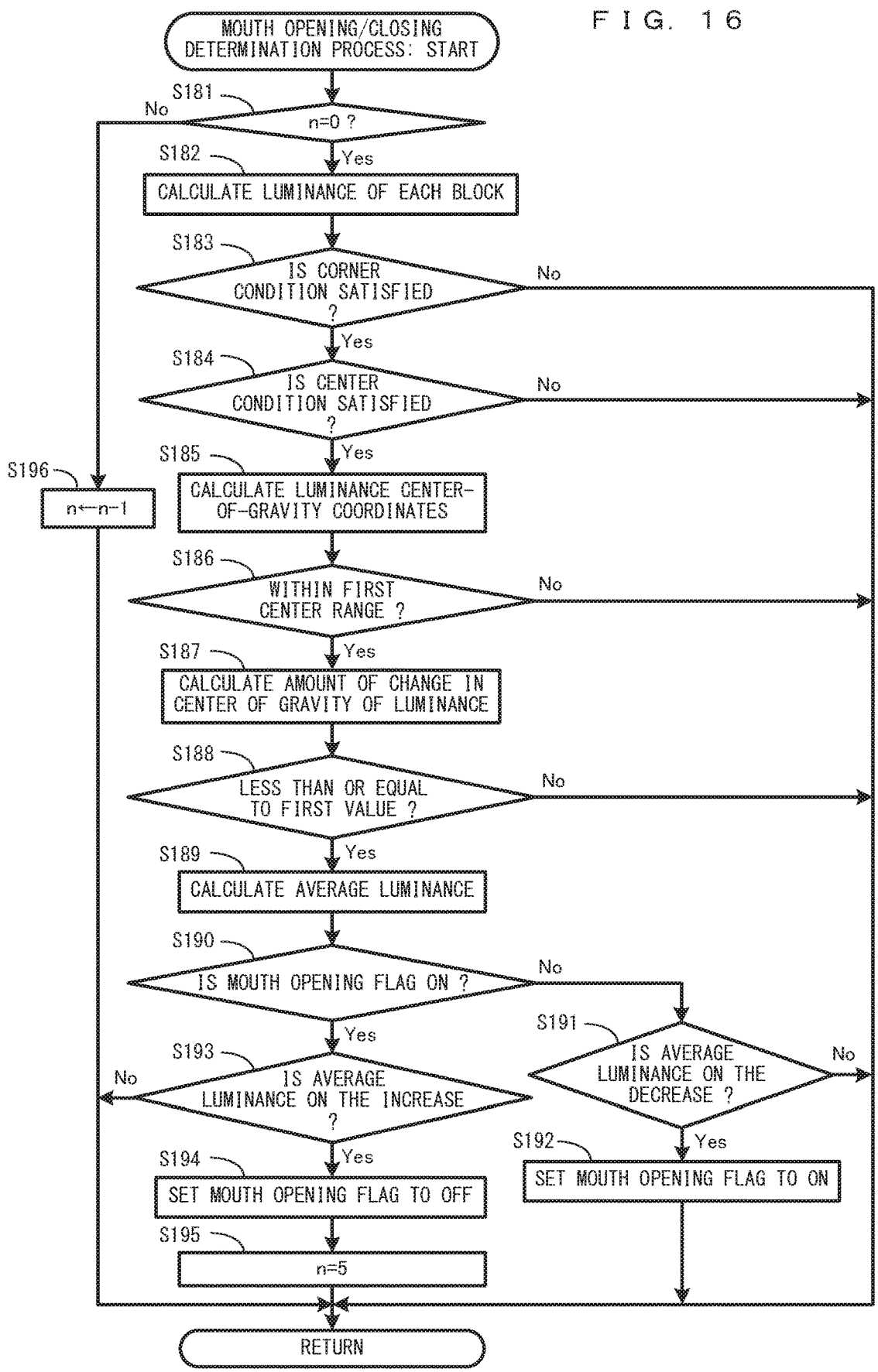
FIG. 16 is a subroutine showing a non-limiting detailed example of a mouth opening/closing determination process executed in step S167 in FIG. 15.
Figure 17:
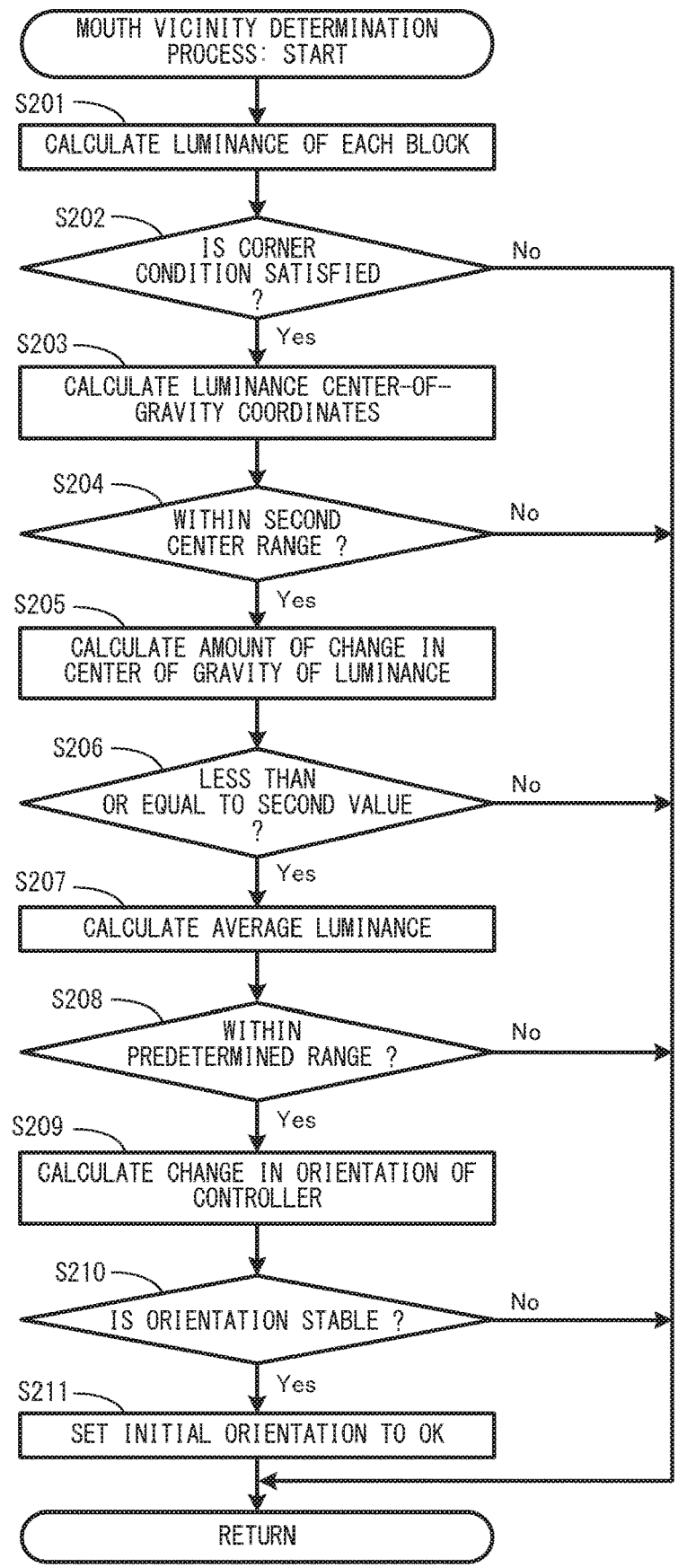
FIG. 17 is a subroutine showing a non-limiting detailed example of a mouth vicinity determination process executed in step S164 in FIG. 15.

Next, a detailed example of information processing (e.g., game processing) according to the exemplary embodiment is described. FIG. 15 is a flow chart showing an example of information processing executed by the main body apparatus 2. FIG. 16 is a subroutine showing a detailed example of a mouth opening/closing determination process executed in step S167 in FIG. 15. FIG. 17 is a subroutine showing a detailed example of a mouth vicinity determination process executed in step S164 in FIG. 15. It should be noted that in the exemplary embodiment, a series of processes shown in FIGS. 15 to 17 is performed by the CPU 81 executing the communication program and a predetermined application program (e.g., a game program) included in the various programs Pa. Further, the information processing shown in FIGS. 15 to 17 is started at any timing.

It should be noted that the processes of all of the steps in the flow charts shown in FIGS. 15 to 17 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU 81 performs the processes of all of the steps in the flow charts. Alternatively, a processor or a dedicated circuit other than the CPU 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, each of the processes shown in FIGS. 15 to 17 may be executed by the cooperation of a plurality of information processing apparatuses including the main body apparatus 2.

In FIG. 15, the CPU 81 performs initialization in game processing (step 161), and the processing proceeds to the next step. For example, in the initialization, the CPU 81 initializes parameters for performing the processing described below. Further, in the initialization, the CPU 81 may initializes, in the captured image captured by the infrared image capturing section 123, a range to be analyzed (an analysis window) to calculate information based on the image capturing result and a plurality of blocks, and may indicate the content of the initialization to the right controller 4.

Next, the CPU 81 indicates to the user an initial orientation for holding the right controller 4 when a game is started (step S162), and the processing proceeds to the next step. For example, the CPU 81 performs a display control process for displaying, on the display 12 of the main body apparatus 2, an operation instruction "let's hold the controller by bringing it close to your mouth" to prepare to start the speed-eating game, and also performs a sound output control process for outputting, from the speakers 88 of the main body apparatus 2, a sound indicating the operation instruction.

Next, the CPU 81 acquires operation data from the right controller 4, thereby updating the operation data Da (step S163), and the processing proceeds to the next step. For example, in accordance with operation data acquired from the right controller 4, the CPU 81 updates the button operation data Da1, the block data Da2, the angular velocity data Da3, and the like.

Next, the CPU 81 performs a mouth vicinity determination process for determining whether or not the user captures the vicinity of the mouth of the user themselves by making the right controller 4 still toward their mouth (step S164), and the processing proceeds to the next step. It should be noted that the details of the mouth vicinity determination process performed in the above step S164 will be described later.

Next, the CPU 81 determines whether or not the user operates the right controller 4 in the initial orientation (step S164). For example, when the initial orientation is set to OK in the mouth vicinity determination process in the above step S164, the determination is affirmative in the above step S164. Then, when it is determined that the user operates the right controller 4 in the initial orientation, the processing proceeds to step S166. On the other hand, when it is determined that the user does not operate the right controller 4 in the initial orientation, the processing returns to step S162, and the process of step S162 is repeated.

In step S166, the CPU 81 acquires operation data from the right controller 4, thereby updating the operation data Da, and the processing proceeds to the next step. It should be noted that the process of step S166 is similar to the process of step S163, and therefore is not described in detail here.

Next, the CPU 81 performs a mouth opening/closing determination process for determining whether the user performs the action of opening their mouth or the action of closing their mouth (step S167), and the processing proceeds to the next step. With reference to FIG. 16, a description is given below of the mouth opening/closing determination process performed in the above step S167.

In FIG. 16, the CPU 81 determines whether or not a temporary variable n used in the mouth opening/closing determination process is 0 (step S181). Then, when the temporary variable n is 0, the processing proceeds to step S182. On the other hand, when the temporary variable n is not 0, the CPU 81 subtracts 1 from the current temporary variable n, thereby updating the current temporary variable n to a new temporary variable n (step S196), and the processing of this subroutine ends.

In step S182, the CPU 81 calculates the average luminance of each block, and the processing proceeds to the next step. For example, using the sum of the luminances of each block indicated by the block data Da2, the CPU 81 divides the sum by the number of pixels in the block, thereby calculating the average luminance of the block. Then, the CPU 81 adds the currently calculated data indicating the average luminance of each block to the previously calculated data, thereby updating the block luminance data Db.

Next, the CPU 81 determines whether or not a corner condition for performing the mouth opening/closing determination process is satisfied (step S183). The determination made in the above step S183 corresponds to the first condition in the mouth opening/closing determination. That is, the CPU 81 determines whether or not, in the average luminance of each block calculated in the above step S182, the average luminance of each of four blocks placed in the corners of a processing target image (e.g., the first row/A-th column block, the first row/H-th column block, the sixth row/A-th column block, and the sixth row/H-th column block shown in FIG. 10) is higher than a predetermined threshold. When the average luminances of two or more blocks are higher than the threshold, the determination is negative in the above step S183. Then, when the corner condition for performing the mouth opening/closing determination process is satisfied, the processing proceeds to step S184. On the other hand, when the corner condition for performing the mouth opening/closing determination process is not satisfied, the processing of this subroutine ends.

In step S184, the CPU 81 determines whether or not a center condition for performing the mouth opening/closing determination process is satisfied. The determination made in the above step S184 corresponds to the fourth condition in the mouth opening/closing determination. That is, the CPU 81 calculates, in the average luminance of each block calculated in the above step S182, the average luminance of the entirety of four blocks placed near the center of the processing target image (e.g., the third row/D-th column block, the third row/E-th column block, the fourth row/D-th column block, and the fourth row/E-th column block shown in FIG. 10) and adds the currently calculated data indicating the average luminance of the entirety of the blocks near the center to the previously calculated data, thereby updating the center luminance data Dd. Next, the CPU 81 calculates the amount of change in the average luminance of the entirety of the blocks near the center from the previously calculated average luminance and determines whether or not the amount of change is greater than a predetermined threshold. When the amount of change is greater than the threshold, the determination is affirmative in the above step S184. Then, when the center condition for performing the mouth opening/closing determination process is satisfied, the processing proceeds to step S185. On the other hand, when the center condition for performing the mouth opening/closing determination process is not satisfied, the processing of this subroutine ends.

In step S185, the CPU 81 calculates the luminance center-of-gravity coordinates of the entirety of the processing target image (the entirety of the block), and the processing proceeds to the next step. For example, the CPU 81 divides the horizontal direction moment of each block indicated by the block data Da2 by the sum of the luminances of the block, thereby calculating the position of the center of gravity in the horizontal direction of the luminance of the block. Then, the CPU 81 divides a value obtained by summing the positions of the center of gravity in the horizontal direction of luminances of all the blocks by the number of blocks, thereby calculating the position of the center of gravity in the horizontal direction of the luminance of the entirety of the processing target image (the entirety of the block). Further, the CPU 81 divides the vertical direction moment of each block indicated by the block data Da2 by the sum of the luminances of the block, thereby calculating the position of the center of gravity in the vertical direction of the luminance of the block. Then, the CPU 81 divides a value obtained by summing the positions of the center of gravity in the vertical direction of the luminances of all the blocks by the number of blocks, thereby calculating the position of the center of gravity in the vertical direction of the luminance of the entirety of the processing target image (the entirety of the block). Then, the CPU 81 adds the currently calculated data indicating the position of the center of gravity in the horizontal direction of the luminance of the entirety of the processing target image (the entirety of the block) and the position of the center of gravity in the vertical direction to the previously calculated data, thereby updating the luminance center-of-gravity coordinate data De.

Next, the CPU 81 determines whether or not the luminance center-of-gravity coordinates are within a first center range (step S186). The determination made in the above step S186 corresponds to the second condition in the mouth opening/closing determination. For example, when the luminance center-of-gravity coordinates of the entirety of the processing target image (the entirety of the block) calculated in the above step S185 are within the first center range set near the center of the entirety of the processing target image (the entirety of the block) (e.g., within four blocks placed near the center (e.g., the third row/D-th column block, the third row/E-th column block, the fourth row/D-th column block, and the fourth row/E-th column block shown in FIG. 10), the determination is affirmative in the above step S186. Then, when the luminance center-of-gravity coordinates are within the first center range, the processing proceeds to step S187. On the other hand, when the luminance center-of-gravity coordinates are not within the first center range, the processing of this subroutine ends.

In step S187, the CPU 81 calculates the amount of change in the center of gravity of the luminance, and the processing proceeds to the next step. For example, with reference to the luminance center-of-gravity coordinate data De, the CPU 81 calculates the distance between the previously calculated luminance center-of-gravity coordinates and the currently calculated luminance center-of-gravity coordinates as the amount of change in the center of gravity of the luminance.

Next, the CPU 81 determines whether or not the amount of change in the center of gravity of the luminance calculated in the above step S187 is less than or equal to a first value (step S188). The determination made in the above step S188 corresponds to the third condition in the mouth opening/closing determination. Then, when the amount of change in the center of gravity of the luminance calculated in the above step S187 is less than or equal to the first value, the CPU 81 determines that the third condition is satisfied. Then, the processing proceeds to step S189. On the other hand, when the amount of change in the center of gravity of the luminance calculated in the above step S187 is greater than the first value, the CPU 81 determines that the third condition is not satisfied. Then, the processing of this subroutine ends.

In step S189, the CPU 81 calculates the average luminance of the entirety of the processing target image (the entirety of the block), and the processing proceeds to the next step. For example, the CPU 81 divides a value obtained by summing the average luminances of all the blocks calculated in the above step S182 by the number of blocks, thereby calculating the average luminance of the entirety of the processing target image (the entirety of the block). Then, the CPU 81 adds the currently calculated data indicating the average luminance of the entirety of the processing target image (the entirety of the block) to the previously calculated data, thereby updating the average luminance data Dc.

Next, with reference to the mouth opening flag data Df, the CPU 81 determines whether or not the mouth opening flag is set to on (step S190). Then, when the mouth opening flag is set to off, the processing proceeds to step S191. On the other hand, when the mouth opening flag is set to on, the processing proceeds to step S193.

In step S191, the CPU 81 determines whether or not the average luminance of the entirety of the processing target image (the entirety of the block) is on the decrease. For example, with reference to the average luminance data Dc, the CPU 81 acquires the currently calculated average luminance and the average luminances in the past calculated three consecutive times most recently. Then, when the currently calculated average luminance is lower than any of the average luminances in the past, the CPU 81 determines that the average luminance of the entirety of the processing target image (the entirety of the block) is on the decrease. Then, when the average luminance of the entirety of the processing target image (the entirety of the block) is on the decrease, the CPU 81 determines that the captured user performs the action of opening their mouth. Then, the CPU 81 sets the mouth opening flag to on, thereby updating the mouth opening flag data Df (step S192), and the processing of this subroutine ends. On the other hand, when the average luminance of the entirety of the processing target image (the entirety of the block) is not on the decrease, the processing of this subroutine immediately ends.

On the other hand, in step S193, the CPU 81 determines whether or not the average luminance of the entirety of the processing target image (the entirety of the block) is on the increase. For example, with reference to the average luminance data Dc, the CPU 81 acquires the currently calculated average luminance and the average luminances in the past calculated three consecutive times most recently. Then, when the currently calculated average luminance is higher than any of the average luminances in the past, the CPU 81 determines that the average luminance of the entirety of the processing target image (the entirety of the block) is on the increase. Then, when the average luminance of the entirety of the processing target image (the entirety of the block) is on the increase, the CPU 81 determines that the captured user performs the action of closing their mouth. Then, the CPU 81 sets the mouth opening flag to off, thereby updating the mouth opening flag data Df (step S194), and the processing proceeds to step S195. On the other hand, when the average luminance of the entirety of the processing target image (the entirety of the block) is not on the increase, the processing of this subroutine immediately ends.

In step S195, the CPU 81 sets the temporary variable n used in the mouth opening/closing determination process to a predetermined natural number (e.g., 5), and the processing of this subroutine ends. Here, the mouth opening/closing determination process in the above steps S182 to S195 is not performed unless the temporary variable n is 0 by the process of step S181. The number of times (the time) the mouth opening/closing determination process is skipped is set in accordance with the natural number set in the above step S195. Then, when the mouth opening flag changes from on to off, i.e., when the user starts the action of closing their mouth, the temporary variable n is set to a number greater than 0. Thus, for a predetermined time after the user starts the action of closing their mouth, the mouth opening/closing determination process (specifically, the process of determining that the user starts the action of opening their mouth) is not performed.

Referring back to FIG. 15, after the mouth opening/closing determination process in the above step S167, the CPU 81 determines whether or not the captured user starts the action of closing their mouth (step S168). For example, when the mouth opening flag is changed from on to off in the most recent mouth opening/closing determination process, i.e., when the above step S194 is executed, the CPU 81 determines that the captured user starts the action of closing their mouth. Then, when the captured user starts the action of closing their mouth, the processing proceeds to step S169. On the other hand, when the captured user does not start the action of closing their mouth, the processing proceeds to step S171.

In step S169, the CPU 81 updates settings regarding a virtual object displayed on a display device (e.g., the display 12), and the processing proceeds to the next step. For example, the CPU 81 increases the number and the amount of virtual objects displayed on the display device by predetermined amounts and updates the object data Dh using the setting values after the increases.

Next, the CPU 81 performs the process of generating the sound of the user eating and the vibration of the user eating (step S170), and the processing proceeds to step S171. For example, the CPU 81 performs sound output control for outputting, from the speakers 88 of the main body apparatus 2, a sound assumed to be the sound of the user eating. Further, the CPU 81 transmits, to the right controller 4 via the controller communication section 83, transmission data for performing vibration output control for outputting, from the vibrator 117 of the right controller 4, a vibration assumed to be the vibration of the user eating.

In step S171, the CPU 81 performs the process of displaying on the display device an image in which the virtual objects are placed, and the processing proceeds to the next step. For example, based on the object data Dh, the CPU 81 sets the number and the amount of virtual objects eaten by the user. Then, based on the settings, the CPU 81 generates a virtual world image in which the virtual objects are placed. Then, the CPU 81 performs the process of displaying the generated virtual world image on the display device (e.g., the display 12 of the main body apparatus 11).

Next, the CPU 81 determines whether or not the game is to be ended (step S172). In the above step S172, examples of a condition for ending the game include: the fact that a condition for ending the game is satisfied; and the fact that the user performs the operation of ending the game. When the game is not to be ended, the processing returns to the above step 228, and the process of step S166 is repeated. When the game is to be ended, the processing of the flow chart ends.

Next, with reference to FIG. 17, a description is given of the mouth vicinity determination process performed in the above step S164. As is clear from the flow chart in FIG. 15, the mouth vicinity determination process performed in the above step S164 is a process performed prior to the mouth opening/closing determination process performed in the above step S167. The mouth opening/closing determination process is not performed until it is determined that the initial orientation is OK in the mouth vicinity determination process.

In FIG. 17, the CPU 81 calculates the average luminance of each block (step S201), and the processing proceeds to the next step. It should be noted that the process of step S201 is similar to the process of step S182, and therefore is not described in detail here.

Next, the CPU 81 determines whether or not a corner condition for performing the mouth vicinity determination process is satisfied (step S202). Then, when the corner condition for performing the mouth vicinity determination process is satisfied, the processing proceeds to step S203. On the other hand, when the corner condition for performing the mouth vicinity determination process is not satisfied, the processing of this subroutine ends. It should be noted that the process of step S202 corresponds to the first condition in the mouth vicinity determination, but is similar to the process of step S183, and therefore is not described in detail here.

In step S203, the CPU 81 calculates luminance center-of-gravity coordinates of the entirety of the processing target image (the entirety of the block), and the processing proceeds to the next step. It should be noted that the process of step S203 is similar to the process of step S185, and therefore is not described in detail here.

Next, the CPU 81 determines whether or not the luminance center-of-gravity coordinates are within a second center range (step S204). The determination made in the above step S204 corresponds to the second condition in the mouth vicinity determination. For example, when the luminance center-of-gravity coordinates of the entirety of the processing target image (the entirety of the block) calculated in the above step S203 are within the second center range set near the center of the entirety of the processing target image (the entirety of the block), the determination is affirmative in the above step S204. Here, it is preferable that the second center range should be set to a range included in the first center range used in step S186 and smaller than the first center range. Consequently, the second condition in the mouth vicinity determination is a condition more severe than the second condition in the mouth opening/closing determination. Then, when the luminance center-of-gravity coordinates are within the second center range, the processing proceeds to step S205. On the other hand, when the luminance center-of-gravity coordinates are not within the second center range, the processing of this subroutine ends.

In step S205, the CPU 81 calculates the amount of change in the center of gravity of the luminance, and the processing proceeds to the next step. It should be noted that the process of step S205 is similar to the process of step S187, and therefore is not described in detail here.

Next, the CPU 81 determines whether or not the amount of change in the center of gravity of the luminance calculated in the above step S205 is less than or equal to a second value (step S206). The determination made in the above step S206 corresponds to the third condition in the mouth vicinity determination. Here, it is preferable that the second value should be set to a value smaller than the first value used in step S188. Consequently, the third condition in the mouth vicinity determination is a condition more severe than the third condition in the mouth opening/closing determination. Then, when the amount of change in the center of gravity of the luminance calculated in the above step S205 is less than or equal to the second value, the processing proceeds to step S207. On the other hand, when the amount of change in the center of gravity of the luminance calculated in the above step S205 is greater than the second value, the processing of this subroutine ends.

In step S207, the CPU 81 calculates the average luminance of the entirety of the processing target image (the entirety of the block), and the processing proceeds to the next step. It should be noted that the process of step S207 is similar to the process of step S189, and therefore is not described in detail here.

Next, the CPU 81 determines whether or not the average luminance of the entirety of the processing target image (the entirety of the block) calculated in the above step S207 is within a predetermined range (step S208). Here, the determination made in the above step S208 corresponds to the fourth condition in the mouth vicinity determination, and is not set as a determination condition in the mouth opening/closing determination. That is, the predetermined range used in the above step S208 is a threshold for making a negative determination when the user places the right controller 4 too close to their face or too far from their face. The predetermined range is set to the range of the average luminance assumed when the user brings the right controller 4 close to their face at an appropriate distance. Then, when the average luminance of the entirety of the processing target image (the entirety of the block) calculated in the above step S207 is within the predetermined range, the processing proceeds to step S209. On the other hand, when the average luminance of the entirety of the processing target image (the entirety of the block) calculated in the above step S207 is not within the predetermined range, the processing of this subroutine ends.

In step S209, the CPU 81 calculates a change in the orientation of the right controller 4, and the processing proceeds to the next step. For example, the CPU 81 acquires, from the angular velocity data Da3, data indicating angular velocities generated in the right controller 4 and calculates a change in the orientation of the right controller 4 about the xyz axes, thereby updating the orientation change data Dg. It should be noted that the value of the change in the orientation calculated in the above step S209 may be the amount of change in values output from the angular velocity sensor 115 of the right controller 4 obtained in the current processing from values output from the angular velocity sensor 115 of the right controller 4 obtained in the previous processing. Alternatively, the value of the change in the orientation calculated in the above step S209 may be the values of angular velocities generated in the right controller 4 obtained in the current processing.

Next, the CPU 81 determines whether or not the orientation of the right controller 4 is stable (step S210). Here, the determination made in the above step S210 corresponds to the fifth condition in the mouth vicinity determination, and is not set as a determination condition in the mouth opening/closing determination. For example, when the change in the orientation of the right controller 4 calculated in the above step S209 is within a predetermined range, the CPU 81 determines that the orientation of the right controller 4 is stable. Then, when the orientation of the right controller 4 is stable, the processing proceeds to step S211. On the other hand, when the orientation of the right controller 4 is not stable, the processing of this subroutine ends.

In step S211, the CPU 81 determines that the user operates the right controller 4 in the initial orientation indicated in the above step S162. Then, the CPU 81 sets the initial orientation to OK, and the processing of this subroutine ends.

As described above, in the exemplary embodiment, the content of the operation performed by the user opening and closing their mouth is detected based on the captured image captured by the infrared image capturing section 123. Here, the opening and closing of the mouth of the user is in the situation where only a part of the face of the user is opened and closed, and the distance between the opened and closed part and the image capturing section changes. However, it is also possible to detect such a change in the uneven shape of an object, using the main body apparatus 2 and the right controller 4, i.e., only the information processing system. Thus, it is possible to achieve this detection with a simple system configuration. Further, the information processing system according to the exemplary embodiment may determine that the unevenness of another subject changes, i.e., the distance between only a part of another subject and the infrared image capturing section 123 changes. In the exemplary embodiment, it is possible to achieve an unconventional object shape determination and an unconventional object position determination for determining the shape of a subject in the image capturing direction of the infrared image capturing section 123 and/or the position of a subject in the image capturing direction of the infrared image capturing section 123, using a captured image using the reflection of infrared light.

It should be noted that in the above exemplary embodiment, an example has been used where a change in the opening and closing of the mouth of the user, i.e., a change in the unevenness of a subject, is determined based on a captured image. Alternatively, it is also possible, based on a captured image, to determine the shape of another subject in the image capturing direction of the infrared image capturing section 123 and/or the position of another subject in the image capturing direction of the infrared image capturing section 123. As an example, it is possible, using a captured image using the reflection of infrared light, determine the shape and/or the position of an object a part of which protrudes toward the infrared image capturing section 123 of the right controller 4, an object a part of which retreats from the infrared image capturing section 123, or an object a part of which opens and closes. As another example, when an object having an uneven shape is captured by the infrared image capturing section 123, the uneven shape of the object is not recognized as a pattern, but the shape of the object including the depth of the uneven shape can be determined using a captured image using the reflection of infrared light.

Further, in the above exemplary embodiment, an example has been used where a change in the unevenness of a subject is determined using the main body apparatus 2 and the right controller 4 detached from the main body apparatus 2. Alternatively, the determination may be made using a single apparatus. For example, the information processing system 1 according to the exemplary embodiment can also capture the face of the user using the infrared image capturing section 123 in the state where the right controller 4 is attached to the main body apparatus 2, and determine the opening and closing of the mouth of the user. The information processing system 1 can also perform game processing based on this determination.

Further, in the above exemplary embodiment, data based on a captured image transmitted from the right controller 4 to the main body apparatus 2 may be data indicating the captured image itself captured by the infrared image capturing section 123. In this case, it is possible that the amount of data transmitted from the right controller 4 to the main body apparatus 2 increases. On the main body apparatus 2 side, however, it is possible to perform various analysis processes regarding the captured image.

Further, in the above exemplary embodiment, the method for detecting the motion or the orientation of the right controller 4 is merely illustrative. Alternatively, the motion or the orientation of the right controller 4 may be detected using another method or other data. For example, although the orientation of the right controller 4 is calculated based only on angular velocities generated in the right controller 4, the orientation may be calculated by combining angular velocities and accelerations generated in the right controller 4, or the orientation may be calculated based only on accelerations generated in the right controller 4. It goes without saying that even when only accelerations generated in the right controller 4 are detected, it is possible to calculate the direction in which a gravitational acceleration generated in the right controller 4 is generated. Thus, it is possible to perform processing similar to that in the above exemplary embodiment by sequentially calculating the xyz axis directions with respect to the gravitational acceleration. Further, in the above exemplary embodiment, a game image corresponding to an operation using the right controller 4 is displayed on the display 12 of the main body apparatus 2, but may be displayed on the stationary monitor via the cradle.

Further, the main body apparatus 2, the left controller 3, and the right controller 4 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the main body apparatus 2 performs information processing (game processing). Alternatively, another apparatus may perform at least some of the processing steps. For example, if the main body apparatus 2 is further configured to communicate with another apparatus (e.g., another server, another image display apparatus, another game apparatus, or another mobile terminal), the other apparatus may cooperate to perform the processing steps. Another apparatus may thus perform at least some of the processing steps, thereby enabling processing similar to that described above. Further, the information processing (game processing) described above can be performed by a processor or the cooperation of a plurality of processors, the processor or the plurality of processors included in the information processing system 1 including at least one information processing apparatus. Further, in the above exemplary embodiment, information processing can be performed by the CPU 81 of the main body apparatus 2 executing a predetermined program. Alternatively, part or all of the processing of the flow charts may be performed by a dedicated circuit included in the main body apparatus 2.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the main body apparatus 2 or the right controller 4 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing system, an information processing program, an information processing apparatus, an information processing method, and the like that can be achieved with a more simple configuration.

What is claimed is:

1. An information processing system including an information processing apparatus and a data transmission device for transmitting data to the information processing apparatus,
    the data transmission device comprising:
        an image capturing unit; and
        a computer configured to:
            generate transmission data including at least data regarding luminances of a plurality of small areas obtained by dividing the entirety of an at least partial area of the captured image captured by the image capturing unit; and
            transmit the generated transmission data to the information processing apparatus,
    the information processing apparatus comprising a computer configured to:
        acquire the transmission data;
        using the acquired transmission data, and based on a luminance of the entirety of the at least partial area of the captured image and the luminance of any of the plurality of small areas, determine a shape of the image capturing target and/or a position of the image capturing target relative to the data transmission device; and
        based on the result of the determination, perform predetermined information processing
    in the generation of the transmission data:
        the entirety of the at least partial area of the captured image is divided into the plurality of the small areas, each of the plurality of the small areas comprising a plurality of pixels,
        the luminance of the entirety of the at least partial area of the captured image is calculated, and
        the luminance of each of the plurality of the small areas is calculated;
    wherein:
        in the generation of the transmission data, the transmission data including data allowing obtaining of coordinates of a center of gravity of the luminance of each of the small areas is generated, and
        in the determination of the position of the image capturing target, the determination is made based on coordinates of a center of gravity of the luminance of the entirety of the area calculated using the data included in the transmission data and allowing the obtaining of the coordinates of the center of gravity.

2. The information processing system according to claim 1, wherein
    in the generation of the transmission data, a use area for use in generating the transmission data in a part of the captured image is set, the entirety of the at least partial area is the use area, and inside of the use area is divided to set the plurality of small areas.

3. The information processing system according to claim 1, wherein
    in the determination of the position of the image capturing target, the determination is made based on whether or not both a change in the luminance of the entirety of the area and a change in the luminance of a small area at a predetermined position among the plurality of small areas occur.

4. The information processing system according to claim 1, wherein in the determination of the position of the image capturing target, when changes in the coordinates of the center of gravity of the luminance in the entirety of the area are less than or equal to a certain change, and both a change in the luminance of the entirety of the area and a change in the luminance of a small area at a predetermined position among the plurality of small areas occur, it is determined that a predetermined portion of the image capturing target changes.

5. The information processing system according to claim 4, wherein
in the determination of the position of the image capturing target, when the changes in the coordinates of the center of gravity of the luminance of the entirety of the area are less than or equal to a certain change, and both the change in the luminance of the entirety of the area and the change in the luminance of the small area at the predetermined position among the plurality of small areas occur, it is determined that a mouth as the image capturing target opens and closes, and
in the performance of the information processing, the number of times the opening and closing of the mouth determined in the determination of the position of the image capturing target is performed in a predetermined time is calculated, and game processing corresponding to the number of times is performed.

6. The information processing system according to claim 1, wherein
the data transmission device further comprises an infrared light emission unit, and
the image capturing unit is an infrared image capturing unit.

7. The information processing system according to claim 1, wherein
the data transmission device further comprises an inertial sensor,
in the transmission of the transmission data, the transmission data including data acquired from the inertial sensor is generated, and
in the determination of the position of the image capturing target, after it is confirmed that a change in an output of the inertial sensor is smaller than a predetermined value, a process of making the determination is started.

8. The information processing system according to claim 1, wherein
in the generation of the transmission data, the entirety of the area is divided into a matrix, thereby setting the plurality of small areas.

9. The information processing system according to claim 1, wherein
in the determination of the position of the image capturing target, based on an average value of the luminance of each of the plurality of small areas, it is determined that a predetermined portion of the image capturing target changes.

10. An information processing system including an information processing apparatus and a data transmission device for transmitting data to the information processing apparatus,
the data transmission device comprising:
an image capturing unit; and
a computer configured to:
generate transmission data including at least data regarding luminances of a plurality of small areas obtained by dividing the entirety of an at least partial area of the captured image captured by the image capturing unit; and
transmit the generated transmission data to the information processing apparatus,
the information processing apparatus comprising a computer configured to:
acquire the transmission data;
using the acquired transmission data, and based on a luminance of the entirety of the at least partial area of the captured image and the luminance of any of the plurality of small areas, determine a shape of the image capturing target and/or a position of the image capturing target relative to the data transmission device; and
based on the result of the determination, perform predetermined information processing
in the generation of the transmission data:
the entirety of the at least partial area of the captured image is divided into the plurality of the small areas, each of the plurality of the small areas comprising a plurality of pixels,
the luminance of the entirety of the at least partial area of the captured image is calculated, and
the luminance of each of the plurality of the small areas is calculated;
wherein:
in the determination of the position of the image capturing target, the determination is made based on whether or not both a change in the luminance of the entirety of the area and a change in the luminance of a small area at a predetermined position among the plurality of small areas occur; and
in the determination of the position of the image capturing target, when coordinates of a center of gravity of the luminance of the entirety of the area are included in a first predetermined range including a center of the entirety of the area, and changes in the coordinates of the center of gravity are less than or equal to a certain change, and both a change in the luminance of the entirety of the area and a change in the luminance of, among the plurality of small areas, a small area included in a second predetermined range including the center of the entirety of the area occur, it is determined that a predetermined portion of the image capturing target changes.

11. A non-transitory computer-readable storage medium having stored therein an information processing program executed by a computer included in an information processing apparatus for receiving data transmitted from a data transmission device including an image capturing unit, the information processing program causing the computer to execute:
acquiring, from the data transmission device, transmission data including at least data regarding luminances of a plurality of small areas obtained by dividing the entirety of an at least partial area of a captured image captured by the image capturing unit;
using the acquired transmission data, and based on a luminance of the entirety of the at least partial area of the captured image and the luminance of any of the plurality of small areas, determining a shape of the image capturing target and/or a position of the image capturing target relative to the data transmission device; and
based on the result of the determination, performing predetermined information processing; wherein:

the entirety of the at least partial area of the captured image is divided into the plurality of the small areas, each of the plurality of the small areas comprising a plurality of pixels, the luminance of the entirety of the at least partial area of the captured image is calculated, the luminance of each of the plurality of the small areas is calculated;

in the acquisition of the transmission data, the transmission data including data allowing obtaining of coordinates of a center of gravity of the luminance of each of the small areas is acquired from the data transmission device, and in the determination of the position of the image capturing target, the determination is made based on coordinates of a center of gravity of the luminance in the entirety of the area calculated using the data included in the transmission data and allowing obtaining of the coordinates of the center of gravity.

12. The non-transitory computer-readable storage medium having stored therein the information processing program according to claim 11, wherein in the making of the determination, the determination is made based on whether or not both a change in the luminance of the entirety of the area and a change in the luminance of a small area at a predetermined position among the plurality of small areas occur.

13. The non-transitory computer-readable storage medium having stored therein the information processing program according to claim 11, wherein in the determination of the position of the image capturing target, when changes in the coordinates of the center of gravity of the luminance of the entirety of the area are less than or equal to a certain change, and both a change in the luminance of the entirety of the area and a change in the luminance of the small area at the predetermined position among the plurality of small areas occur, it is determined a predetermined portion of the image capturing target changes.

14. The non-transitory computer-readable storage medium having stored therein the information processing program according to claim 11, wherein in the determination of the position of the image capturing target, when the changes in the coordinates of the center of gravity of the luminance of the entirety of the area are less than or equal to a certain change, and both the change in the luminance of the entirety of the area and the change in the luminance of the small area at the predetermined position among the plurality of small areas occur, it is determined that a mouth as the image capturing target opens and closes, and in the performance of the information processing, the number of times the opening and closing of the mouth determined in the determination of the position of the image capturing target is performed in a predetermined time is calculated, and game processing corresponding to the number of times is performed.

15. A non-transitory computer-readable storage medium having stored therein an information processing program executed by a computer included in an information processing apparatus for receiving data transmitted from a data transmission device including an image capturing unit, the information processing program causing the computer to execute:

acquiring, from the data transmission device, transmission data including at least data regarding luminances of a plurality of small areas obtained by dividing the entirety of an at least partial area of a captured image captured by the image capturing unit;

using the acquired transmission data, and based on a luminance of the entirety of the at least partial area of the captured image and the luminance of any of the plurality of small areas, determining a shape of the image capturing target and/or a position of the image capturing target relative to the data transmission device; and based on the result of the determination, performing predetermined information processing; wherein:

the entirety of the at least partial area of the captured image is divided into the plurality of the small areas, each of the plurality of the small areas comprising a plurality of pixels, the luminance of the entirety of the at least partial area of the captured image is calculated, the luminance of each of the plurality of the small areas is calculated;

in the making of the determination, the determination is made based on whether or not both a change in the luminance of the entirety of the area and a change in the luminance of a small area at a predetermined position among the plurality of small areas occur; and in the determination of the position of the image capturing target, when coordinates of a center of gravity of the luminance of the entirety of the area are included in a first predetermined range including a center of the entirety of the area, and changes in the coordinates of the center of gravity are less than or equal to a certain change, and both a change in the luminance of the entirety of the area and a change in the luminance of, among the plurality of small areas, a small area included in a second predetermined range including the center of the entirety of the area occur, it is determined that a predetermined portion of the image capturing target changes.

16. An information processing method for performing information processing based on data transmitted from a data transmission device including an image capturing unit, the information processing method comprising:

generating transmission data including at least data regarding luminances of a plurality of small areas obtained by dividing the entirety of at least partial area of a captured image captured by the image capturing unit;

transmitting the generated transmission data;

acquiring the transmission data;

using the acquired transmission data, and based on a luminance of the entirety of the at least partial area of the captured image and the luminance of any of the plurality of small areas, determining a shape of the image capturing target and/or a position of the image capturing target relative to the data transmission device; and based on the result of the determination, performing predetermined information processing in the generating of the transmission data:

the entirety of the at least partial area of the captured image is divided into the plurality of the small areas, each of the plurality of the small areas comprising a plurality of pixels, the luminance of the entirety of the at least partial area of the captured image is calculated, and the luminance of each of the plurality of the small areas is calculated; wherein:

in the generation of the transmission data, the transmission data including data allowing obtaining of coordinates of a center of gravity of the luminance of each of the small areas is generated, and in the determination of the position of the image capturing target, the determination is made based on coordinates of a center of gravity of the luminance of the entirety of the area calculated using the data included in the transmission data and allowing the obtaining of the coordinates of the center of gravity.

17. The information processing method according to claim 16, wherein in the generation of the transmission data, a use area for use in generating the transmission data in a part of the captured image is set, the entirety of the at least partial area is the use area, and inside of the use area is divided to set the plurality of small areas.

18. The information processing method according to claim 16, wherein in the determination of the position of the image capturing target, the determination is made based on whether or not both a change in the luminance of the entirety of the area and a change in the luminance of a small area at a predetermined position among the plurality of small areas occur.

19. The information processing method according to claim 16, wherein in the determination of the position of the image capturing target, when changes in the coordinates of the center of gravity of the luminance in the entirety of the area are less than or equal to a certain change, and both a change in the luminance of the entirety of the area and a change in the luminance of a small area at a predetermined position among the plurality of small areas occur, it is determined that a predetermined portion of the image capturing target changes.

20. An information processing method for performing information processing based on data transmitted from a data transmission device including an image capturing unit, the information processing method comprising:

generating transmission data including at least data regarding luminances of a plurality of small areas obtained by dividing the entirety of at least partial area of a captured image captured by the image capturing unit;

transmitting the generated transmission data;

acquiring the transmission data;

using the acquired transmission data, and based on a luminance of the entirety of the at least partial area of the captured image and the luminance of any of the plurality of small areas, determining a shape of the image capturing target and/or a position of the image capturing target relative to the data transmission device; and based on the result of the determination, performing predetermined information processing in the generating of the transmission data:

the entirety of the at least partial area of the captured image is divided into the plurality of the small areas, each of the plurality of the small areas comprising a plurality of pixels, the luminance of the entirety of the at least partial area of the captured image is calculated, and the luminance of each of the plurality of the small areas is calculated; wherein:

in the determination of the position of the image capturing target, the determination is made based on whether or not both a change in the luminance of the entirety of the area and a change in the luminance of a small area at a predetermined position among the plurality of small areas occur;

in the determination of the position of the image capturing target, when coordinates of a center of gravity of the luminance of the entirety of the area are included in a first predetermined range including a center of the entirety of the area, and changes in the coordinates of the center of gravity are less than or equal to a certain change, and both a change in the luminance of the entirety of the area and a change in the luminance of, among the plurality of small areas, a small area included in a second predetermined range including the center of the entirety of the area occur, it is determined that a predetermined portion of the image capturing target changes.

* * * * *